United States Patent
Koenig et al.

(10) Patent No.: US 10,745,496 B2
(45) Date of Patent: Aug. 18, 2020

(54) PREPARATION OF ISOBUTENE HOMO- OR COPOLYMER DERIVATIVES

(71) Applicant: BASF SE, Ludwigshafen (DE)

(72) Inventors: Hannah Maria Koenig, Mannheim (DE); Klaus Muehlbach, Gruenstadt (DE); Helmut Mach, Heidelberg (DE); Ulrich Eichenauer, Boehl-Iggelheim (DE)

(73) Assignee: BASF SE, Ludwigshafen (DE)

( * ) Notice: Subject to any disclaimer, the term of this patent is extended or adjusted under 35 U.S.C. 154(b) by 98 days.

(21) Appl. No.: 15/046,987

(22) Filed: Feb. 18, 2016

(65) Prior Publication Data

US 2016/0168282 A1    Jun. 16, 2016

Related U.S. Application Data

(62) Division of application No. 13/305,283, filed on Nov. 28, 2011, now Pat. No. 9,296,841.

(60) Provisional application No. 61/522,313, filed on Aug. 11, 2011, provisional application No. 61/417,898, filed on Nov. 30, 2010.

(51) Int. Cl.
| | |
|---|---|
| *C08F 4/14* | (2006.01) |
| *C08F 8/32* | (2006.01) |
| *C08F 8/46* | (2006.01) |
| *C08F 4/26* | (2006.01) |
| *C08F 8/00* | (2006.01) |
| *C08F 8/30* | (2006.01) |
| *C08F 8/34* | (2006.01) |
| *C08F 10/10* | (2006.01) |
| *C08F 110/10* | (2006.01) |
| *C08F 210/10* | (2006.01) |

(52) U.S. Cl.
CPC .............. *C08F 4/14* (2013.01); *C08F 4/26* (2013.01); *C08F 8/00* (2013.01); *C08F 8/30* (2013.01); *C08F 8/32* (2013.01); *C08F 8/34* (2013.01); *C08F 8/46* (2013.01); *C08F 10/10* (2013.01); *C08F 110/10* (2013.01); *C08F 210/10* (2013.01)

(58) Field of Classification Search
CPC ...... C08F 4/14; C08F 4/26; C08F 8/32; C08F 8/46; C08F 8/00; C08F 8/30; C08F 8/34; C08F 10/10; C08F 110/10; C08F 210/10
USPC ...................................................... 525/333.7
See application file for complete search history.

(56) References Cited

U.S. PATENT DOCUMENTS

| | | | |
|---|---|---|---|
| 3,215,707 A * | 11/1965 | Rense ..................... | C07C 57/13 548/546 |
| 4,316,973 A | 2/1982 | Kennedy | |
| 4,832,702 A * | 5/1989 | Kummer ............... | C10L 1/2383 44/412 |
| 4,849,572 A | 7/1989 | Chen et al. | |
| 4,877,416 A | 10/1989 | Campbell | |
| 5,340,881 A | 8/1994 | Kennedy et al. | |
| 5,408,018 A | 4/1995 | Rath | |
| 6,303,703 B1 | 10/2001 | Kinder et al. | |
| 9,296,841 B2 * | 3/2016 | Konig ...................... | C08F 8/00 |
| 9,562,117 B2 * | 2/2017 | Konig ...................... | C08F 8/14 |
| 2005/0107551 A1 * | 5/2005 | Lang ....................... | C08F 8/00 526/82 |
| 2006/0079655 A1 | 4/2006 | Chung et al. | |
| 2008/0103272 A1 | 5/2008 | Chen et al. | |
| 2008/0188385 A1 * | 8/2008 | Huang .................. | C10M 133/56 508/287 |
| 2008/0274924 A1 * | 11/2008 | Lange .................... | C10L 1/221 508/542 |
| 2008/0312384 A1 * | 12/2008 | Bruchmann ......... | C08G 83/005 525/449 |
| 2011/0201772 A1 * | 8/2011 | Konig ..................... | C08F 10/10 526/204 |
| 2011/0230621 A1 | 9/2011 | Hildebrandt et al. | |
| 2012/0142868 A1 * | 6/2012 | Konig ...................... | C08F 8/30 525/333.9 |

FOREIGN PATENT DOCUMENTS

| | | | | |
|---|---|---|---|---|
| CA | 2789843 A1 * | 8/2011 | ............. | C08F 10/10 |
| CN | 101955558 A * | 1/2011 | | |

(Continued)

OTHER PUBLICATIONS

CN 101955558, machine translation, dated Jan. 2011.*

(Continued)

*Primary Examiner* — Michael Bernshteyn
(74) *Attorney, Agent, or Firm* — Oblon, McClelland, Maier & Neustadt, L.L.P.

(57) ABSTRACT

A process for preparing isobutene homo- or copolymer derivatives by (i) polymerizing isobutene or an isobutene-comprising monomer mixture in the presence of an iron halide-donor complex, an aluminum trihalide-donor complex, or an alkylaluminum halide-donor complex, (ii) reacting a resulting high-reactivity isobutene polymer with a compound which introduces a low molecular weight polar group or a substructure thereof, and (iii) in the case of reaction with a substructure, further reacting to complete the formation of the low molecular weight polar group. The homo- or copolymer derivatives include a radical of a hydrophobic polyisobutene polymer having a number-average molecular weight of 110 to 250 000 and low molecular weight polar groups including amino functions, nitro groups, hydroxyl groups, mercaptan groups, carboxylic acid or carboxylic acid derivative functions, sulfonic acid or sulfonic acid derivative functions, aldehyde functions and/or silyl groups.

16 Claims, No Drawings

(56) References Cited

FOREIGN PATENT DOCUMENTS

| | | | |
|---|---|---|---|
| CN | 101955558 A * | 1/2011 | |
| DE | 27 02 604 A1 | 7/1978 | |
| DE | 38 38 918 A1 | 5/1990 | |
| DE | 196 20 262 A1 | 11/1997 | |
| EP | 0 145 235 A1 | 6/1985 | |
| EP | 0 244 616 A2 | 11/1987 | |
| EP | 0 310 875 A1 | 4/1989 | |
| EP | 0 356 725 A1 | 3/1990 | |
| EP | 0 476 485 A1 | 3/1992 | |
| EP | 0 639 632 A1 | 2/1995 | |
| EP | 0 700 985 A1 | 3/1996 | |
| EP | 0 831 141 A1 | 3/1998 | |
| WO | WO 90/10022 | 9/1990 | |
| WO | WO 96/03367 | 2/1996 | |
| WO | WO 96/03479 A1 | 2/1996 | |
| WO | WO 97/03946 | 2/1997 | |
| WO | WO 99/64482 | 12/1999 | |
| WO | WO 03/074577 A1 | 9/2003 | |
| WO | WO 2004/067583 A1 | 8/2004 | |
| WO | WO 2006/011868 A1 | 2/2006 | |
| WO | WO 2007/025700 A1 | 3/2007 | |
| WO | WO 2010/125035 A1 | 11/2010 | |
| WO | WO 2010/139684 A1 | 12/2010 | |
| WO | WO 2011/054785 A1 | 5/2011 | |
| WO | WO 2011/101281 A1 | 8/2011 | |

OTHER PUBLICATIONS

Edward C. Leonard, "Vinyl and Diene Monomers", Part 2, High Polymers, vol. 24, 1971, 22 pages.
http://en.wikipedia.org/wiki/Integer, May 2014.
http://en.wikipedia.org/wiki/Real_number, May 2014.
Liu et al., Polymer 51 (2010) 5960-5969.
International Search Report and Written Opinion of the International Searching Authority dated Aug. 10, 2012 in PCT/EP2011/071306 (with English Translation of Categories of Cited Documents).
Qiang Liu et al., "Polyisobutylene with High exo-Olefin Content via β-H Elimination in the Cationic Polymerization of Isobutylene with $H_2O/FeCl_3$/Dialkyl Ether Initiating System", American Chemical Society, XP55023424, vol. 44, 2011, pp. 1866-1875.
Qiang Liu et al., "A cost-effective process for highly reactive polyisobutylenes via cationic polymerization coinitiated by $AlCl_3$", Elsevier Ltd., XP027506637, vol. 51, 2010, pp. 5960-5969.
Irina V. Vasilenko et al., "Cationic Polymerization of Isobutylene Using $AlCl_3OBu_2$ as a Coinitiator: Synthesis of Highly Reactive Polyisobutylene", Macromolecules, American Chemical Society, XP55034234, vol. 43, No. 13, 2010, pp. 5503-5507.
Hung Anh Nguyen et al., "Cationic Polymerization of Isobutylene Initiated by Diol/Boron Trichloride Systems", Polymer Bulletin, XP002681059, vol. 11, No. 2, 1984, pp. 99-104.
Vasilenko et al., Macromolecules 43 (2010) 5503-5507.

* cited by examiner

PREPARATION OF ISOBUTENE HOMO- OR COPOLYMER DERIVATIVES

CROSS-REFERENCE TO RELATED APPLICATIONS

This application is a Divisional of U.S. Non-Provisional application Ser. No. 13/305,283, which was filed on Nov. 28, 2011. This application is based upon and claims the benefit of priority to U.S. Provisional Application No. 61/522,313, which was filed on Aug. 11, 2011, and to U.S. Provisional Application No. 61/417,898, which was filed on Nov. 30, 2010.

The present invention relates to an improved process for preparing isobutene homo- or copolymer derivatives. The present invention further relates to novel isobutene homopolymer derivatives.

Isobutene homo- or copolymer derivatives such as polyisobuteneamines or polyisobutenylsuccinanhydrides are often obtained from so-called high-reactivity isobutene homo- or copolymers. In contrast to so-called low-reactivity polymers, high-reactivity isobutene homo- or copolymers are understood to mean those polyisobutenes which comprise a high content of terminal ethylenic double bonds (α-double bonds), specifically in practice of 80 mol % or more, based on the individual chain ends of the polyisobutene macromolecules. Vinylidene groups are normally understood to mean those double bonds whose position in the polyisobutene macromolecule is described by the general formula

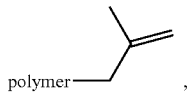

i.e. the double bond is present in an a position in the polymer chain. "Polymer" represents the polyisobutene radical shortened by one isobutene unit. The vinylidene groups exhibit the highest reactivity, for example in the thermal addition onto sterically demanding reactants such as maleic anhydride, whereas a double bond further toward the interior of the macromolecules in most cases exhibits lower reactivity, if any, in functionalization reactions.

The uses of such high-reactivity polyisobutenes include use as intermediates for preparing additives for lubricants and fuels; for example, according to the teaching of DE-A 27 02 604, they are reacted with maleic anhydride to give polyisobutenylsuccinic anhydrides. However, the high-reactivity polyisobutenes obtainable by the process of DE-A 27 02 604 by cationic polymerization of isobutene in the liquid phase in the presence of boron trifluoride as a catalyst have some disadvantages; for example they have a relatively high polydispersity. The polydispersity is a measure of the molecular weight distribution of the resulting polymer chains and corresponds to the quotient of weight-average molecular weight $M_w$ and number-average molecular weight $M_n$ (PDI=$M_w/M_n$).

Polyisobutenes with a similarly high proportion of terminal double bonds but with a narrower molecular weight distribution are, for example, obtainable by the process of EP-A 145 235, U.S. Pat. No. 5,408,018 and WO 99/64482, the polymerization being effected in the presence of a deactivated catalyst, for example of a complex of boron trifluoride with alcohols and/or ethers.

High-reactivity polyisobutenes are also obtainable by living cationic polymerization of isobutene and subsequent dehydrohalogenation of the resulting polymerization product, for example by the process from U.S. Pat. No. 5,340,881. However, such a process is complex since the halogen end group introduced with the living cationic polymerization has to be eliminated in a separate step in order to generate the double bond.

It has additionally been known for some time that the Lewis acid aluminum trichloride can also be used as a polymerization catalyst for isobutene, for example from High Polymers, volume XXIV (part 2), p. 713-733 (editor: Edward C. Leonard), J. Wiley & Sons publishers, New York, 1971.

The European patent application with the reference number 10157068.7, which was yet to be published at the priority date of the present application, describes a process for preparing high-reactivity isobutene homo- or copolymers by polymerization in the presence of an aluminum trihalide-donor complex which is effective as a polymerization catalyst or of an alkyl aluminum halide-donor complex which comprises, as the donor, an organic compound with at least one ether function or a carboxylic ester function, and optionally an organic hydroxyl compound, an organic halogen compound or water as an initiator. Further reactions with the high-reactivity isobutene homo- or copolymers thus prepared are not described therein.

CN 101955558 A discloses that iron(III) chloride is suitable as a coinitiator in the cationic isobutene polymerization for preparation of high-reactivity polyisobutenes and copolymers thereof. The initiators recommended are water, phenols, protic acids such as sulfuric acid, tertiary alcohols, tertiary chlorides, tertiary carboxylic esters and carboxylic acids themselves. The complexing agents mentioned for the systems which initiate the polymerization are especially alkyl ethers.

However, the derivatization methods known from the prior art for high-reactivity isobutene homo- or copolymers, for example to prepare polyisobutenylsuccinic anhydrides according to the teaching of DE-A 27 02 604, have a series of deficiencies. For instance, the content of terminal vinylidene double bonds in the precursor is still too low. The yields in the conversion to the derivatives are in need of improvement. The appearance and the consistency of the derivatives, especially the suppression of discoloration, for example caused by undesired carbonization reactions in the course of thermal stress during derivatization, are still not optimal. Moreover, the physical properties of the derivatives, especially the viscosity behavior at low temperatures, as can occur, for example, in practical use in lubricant oils, and the solubility, especially in polar media, the thermal stability and the storage stability of the additives are still in need of improvement. The derivatization processes known from the prior art for isobutene polymers which proceed from isobutene polymers prepared by means of fluorinated polymerization catalysts have the disadvantage that they trigger corrosion on numerous metallic materials and steel types owing to the residual fluorine content.

It was an object of the present invention, proceeding from high-reactivity isobutene homo- or copolymers, to provide an improved process for preparing isobutene homo- or copolymer derivatives, which no longer has the deficiencies of the prior art. More particularly, the isobutene homo- or copolymer derivatives should be preparable from isobutene polymers with a high content of terminal vinylidene double bonds, especially at least 50 mol %, preferably at least 60 mol %, preferably at least 70 mol %, preferably at least 80 mol %, preferably at least 85 mol %, more preferably at least 90 mol %, and in acceptable yields. In addition, appearance and consistency of the derivatives, for example the color thereof, should be improved. In addition, the physical properties of the derivatives, especially the viscosity behavior at low temperatures, and the solubilities, especially in polar media, the thermal stability and the storage stability of the derivatives should be improved. Any catalyst system used to obtain the isobutene polymers in the precursor should be sufficiently active, have a long life, and be unproblematic in terms of handling and not be susceptible to faults; more particularly, it should be free of fluorine in order to prevent corrosion on metallic materials and steel types caused by residual fluorine content.

The object is achieved by a process for preparing isobutene homo- or copolymer derivatives of the general formula I $$POL(-A)_n \qquad (I)$$

in which

POL denotes the n-functional radical of a hydrophobic polyisobutene homo- or copolymer which has a number-average molecular weight ($M_n$) of 110 to 250 000 and may comprise incorporated structural units formed from mono-, di- or trifunctional initiators, A is a low molecular weight polar group which in each case comprises one or more amino functions and/or nitro groups and/or hydroxyl groups and/or mercaptan groups and/or carboxylic acid or carboxylic acid derivative functions, especially succinic anhydride or succinic acid derivative functions, and/or sulfonic acid or sulfonic acid derivative functions and/or aldehyde functions and/or silyl groups, and the variable n is 1, 2 or 3, where the variables A may be the same or different when n=2 and n=3, which comprises polymerizing isobutene or an isobutene-comprising monomer mixture in the presence (A) of an iron halide-donor complex effective as a polymerization catalyst, of an aluminum trihalide-donor complex or of an alkylaluminum halide-donor complex which comprises, as the donor, an organic compound with at least one ether function or a carboxylic ester function, or (B) of at least one Lewis acid suitable as a polymerization catalyst or of a complex which is effective as a polymerization catalyst and is formed from at least one Lewis acid and at least one donor, and in the presence of at least one initiator, using as the at least one initiator an organic sulfonic acid of the general formula Z—SO$_3$H in which the variable Z denotes a $C_1$- to $C_{20}$-alkyl radical, $C_1$- to $C_{20}$-haloalkyl radical, $C_5$- to $C_8$-cycloalkyl radical, $C_6$- to $C_{20}$-aryl radical or $C_7$- to $C_{20}$-arylalkyl radical, reacting the resulting high-reactivity isobutene homo- or copolymer which has a content of at least 50 mol % of terminal vinylidene double bonds per polyisobutene chain end with at least n equivalents of a compound which introduces the low molecular weight polar A group or a substructure of the low molecular weight polar A group and, in the case of reaction with a substructure, completing the formation of the low molecular weight polar A group by further reactions.

The polymerization method for isobutene or isobutene-comprising monomer mixtures according to embodiment (A), which is essential to this invention, is described in essence in the above-cited European patent application with reference number 10157068.7, which was yet to be published at the priority date of the present application, and is reproduced below.

Isobutene homopolymers are understood in the context of the present invention to mean those polymers which, based on the polymer, are formed from isobutene to an extent of at least 98 mol %, preferably to an extent of at least 99 mol %. Accordingly, isobutene copolymers are understood to mean those polymers which comprise more than 2 mol % of copolymerized monomers other than isobutene, for example linear butenes.

In the context of the present invention, the following definitions apply to generically defined radicals:

A $C_1$- to $C_8$-alkyl radical is a linear or branched alkyl radical having 1 to 8 carbon atoms. Examples thereof are methyl, ethyl, n-propyl, isopropyl, n-butyl, 2-butyl, isobutyl, tert-butyl, pentyl, 1-methylbutyl, 2-methylbutyl, 3-methylbutyl, 2,2-dimethylpropyl, 1-ethylpropyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, n-octyl and the constitutional isomers thereof, such as 2-ethylhexyl. Such $C_1$- to $C_8$-alkyl radicals may to a small extent also comprise heteroatoms such as oxygen, nitrogen or halogen atoms, for example chlorine, and/or aprotic functional groups, for example carboxyl ester groups, cyano groups or nitro groups.

A $C_1$- to $C_{20}$-alkyl radical is a linear or branched alkyl radical having 1 to 20 carbon atoms. Examples thereof are the abovementioned $C_1$- to $C_8$-alkyl radicals, and additionally n-nonyl, isononyl, n-decyl, 2-propylheptyl, n-undecyl, n-dodecyl, n-tridecyl, isotridecyl, n-tetradecyl, n-hexadecyl, n-octadecyl and n-eicosyl. Such $C_1$- to $C_{20}$-alkyl radicals may to a small extent also comprise heteroatoms such as oxygen, nitrogen or halogen atoms, for example chlorine, and/or aprotic functional groups, for example carboxyl ester groups, cyano groups or nitro groups.

A $C_5$- to $C_6$-cycloalkyl radical is a saturated cyclic radical which may comprise alkyl side chains. Examples thereof are cyclopentyl, 2- or 3-methylcyclopentyl, 2,3-, 2,4- or 2,5-dimethylcyclopentyl, cyclohexyl, 2-, 3- or 4-methylcyclohexyl, 2,3-, 2,4-, 2,5-, 2,6-, 3,4-, 3,5- or 3,6-dimethylcyclohexyl, cycloheptyl, 2-, 3- or 4-methylcycloheptyl, cyclooctyl, 2-, 3-, 4- or 5-methylcyclooctyl. Such $C_5$- to $C_8$-cycloalkyl radicals may to a small extent also comprise heteroatoms such as oxygen, nitrogen or halogen atoms, for example chlorine, and/or aprotic functional groups, for example carboxyl ester groups, cyano groups or nitro groups.

A $C_6$- to $C_{20}$-aryl radical or a $C_6$- to $C_{12}$-aryl radical is preferably optionally substituted phenyl, optionally substituted naphthyl, optionally substituted anthracenyl or optionally substituted phenanthrenyl. Such aryl radicals may be a 1 to 5 aprotic substituents or aprotic functional groups, for example $C_1$- to $C_8$-alkyl, $C_1$- to $C_8$-haloalkyl such as $C_1$- to $C_8$-chloroalkyl or $C_1$- to $C_8$-fluoroalkyl, halogens such as chlorine or fluorine, nitro, cyano or phenyl. Examples of such aryl radicals are phenyl, naphthyl, biphenyl, anthracenyl, phenanthrenyl, tolyl, nitrophenyl, chlorophenyl, dichlorophenyl, pentafluorophenyl, pentachlorophenyl, (trifluoromethyl)phenyl, bis(tri-fluoromethyl)phenyl, (trichloro)methylphenyl and bis(trichloromethyl)phenyl.

A $C_7$- to $C_{20}$-arylalkyl radical or a $C_7$- to $C_{12}$-arylalkyl radical is preferably optionally substituted $C_1$- to $C_4$-alkylphenyl such as benzyl, o-, m- or p-methylbenzyl, 1- or 2-phenylethyl, 1-, 2- or 3-phenylpropyl or 1-, 2-, 3- or 4-phenylbutyl, optionally substituted $C_1$- to $C_4$-alkylnaphthyl such as naphthylmethyl, optionally substituted $C_1$- to $C_4$-alkylanthracenyl such as anthracenylmethyl, or optionally substituted $C_1$- to $C_4$-alkylphenanthrenyl such as phenanthrenylmethyl. Such arylalkyl radicals may bear 1 to 5 aprotic substituents or aprotic functional groups, especially on the aryl moiety, for example $C_1$- to $C_8$-alkyl, $C_1$- to $C_8$-haloalkyl such as $C_1$- to $C_8$-chloroalkyl or $C_1$- to $C_8$-fluoroalkyl, halogen such as chlorine or fluorine, nitro or phenyl.

Suitable iron halides in the corresponding complexes with donors are, for example, iron(II) fluoride, iron(III) fluoride, iron(II) chloride, iron(III) chloride, iron(II) bromide and iron(III) bromide, and mixtures thereof. Preference is given to using iron chloride, i.e. iron(II) chloride and iron(III) chloride, and mixtures of iron(II) chloride and iron(III) chloride, but especially iron(III) chloride alone. It is also possible to use iron halides, especially iron chlorides, which have been obtained from iron-comprising metal alloys, i.e. in addition to iron halides, especially iron chlorides, also comprise other metal halides, though the iron halides, especially iron chlorides, preferably constitute the main constituents of such mixtures.

A suitable aluminum trihalide is especially aluminum trifluoride, aluminum trichloride or aluminum tribromide. A useful alkylaluminum halide is especially a mono($C_1$- to $C_4$-alkyl)aluminum dihalide or a di($C_1$- to $C_4$-alkyl)aluminum monohalide, for example methylaluminum dichloride, ethylaluminum dichloride, dimethylaluminum chloride or diethylaluminum chloride. In a preferred embodiment, isobutene or an isobutene-comprising monomer mixture is polymerized in the presence of an aluminum trichloride-donor complex effective as a polymerization catalyst.

If the iron halide-donor complex, aluminum trihalide-donor complex or alkylaluminum halide-donor complex effective as a polymerization catalyst comprises, as the donor, an organic compound with at least one ether function, compounds with at least one ether function are also understood to mean acetals and hemiacetals.

In a preferred embodiment of the present invention, an iron halide-donor complex, an aluminum trihalide-donor complex or an alkylaluminum halide-donor complex, especially an iron chloride-donor complex or an aluminum trichloride-donor complex, is used, which comprises, as the donor, a dihydrocarbyl ether of the general formula $R^1$—O—$R^2$ in which the variables $R^1$ and $R^2$ are each independently $C_1$- to $C_{20}$-alkyl radicals, especially $C_1$- to $C_8$ alkyl radicals, $C_5$- to $C_8$-cycloalkyl radicals, $C_6$- to $C_{20}$-aryl radicals, especially $C_6$- to $C_{12}$ aryl radicals, or $C_7$- to $C_{20}$-arylalkyl radicals, especially $C_7$- to $C_{12}$-arylalkyl radicals.

The dihydrocarbyl ethers mentioned may be open-chain or cyclic, where the two variables $R^1$ and $R^2$ in the case of the cyclic ethers may join to form a ring, where such rings may also comprise two or three ether oxygen atoms. Examples of such open-chain and cyclic dihydrocarbyl ethers are dimethyl ether, diethyl ether, di-n-propyl ether, diisopropyl ether, di-n-butyl ether, di-sec-butyl ether, diisobutyl ether, di-n-pentyl ether, di-n-hexyl ether, di-n-heptyl ether, di-n-octyl ether, di-(2-ethylhexyl) ether, methyl n-butyl ether, methyl sec-butyl ether, methyl isobutyl ether, methyl tert-butyl ether, ethyl n-butyl ether, ethyl sec-butyl ether, ethyl isobutyl ether, n-propyl-n-butyl ether, n-propyl sec-butyl ether, n-propyl isobutyl ether, n-propyl tert-butyl ether, isopropyl n-butyl ether, isopropyl sec-butyl ether, isopropyl isobutyl ether, isopropyl tert-butyl ether, methyl n-hexyl ether, methyl n-octyl ether, methyl 2-ethylhexyl ether, ethyl n-hexyl ether, ethyl n-octyl ether, ethyl 2-ethylhexyl ether, n-butyl n-octyl ether, n-butyl 2-ethylhexyl ether, tetrahydrofuran, tetrahydropyran, 1,2-, 1,3- and 1,4-dioxane, dicyclohexyl ether, diphenyl ether, ditolyl ether, dixylyl ether and dibenzyl ether. Among the dihydrocarbyl ethers mentioned, di-n-butyl ether and diphenyl ether have been found to be particularly advantageous as donors for the iron halide-donor complexes, the aluminum trihalide-donor complexes or the alkylaluminum halide-donor complexes, especially the iron chloride-donor complexes or the aluminum trichloride-donor complexes.

In a further preferred embodiment of the present invention, as an alternative, an iron halide-donor complex, an aluminum trihalide-donor complex or an alkylaluminum halide-donor complex, especially an iron chloride-donor complex or an aluminum trichloride-donor complex, is used, which comprises, as the donor, a hydrocarbyl carboxylate of the general formula $R^3$—COO$R^4$ in which the variables $R^3$ and $R^4$ are each independently $C_1$- to $C_{20}$-alkyl radicals, especially $C_1$- to $C_8$ alkyl radicals, $C_5$- to $C_8$-cycloalkyl radicals, $C_6$- to $C_{20}$-aryl radicals, especially $C_6$- to $C_{12}$ aryl radicals, or $C_7$- to $C_{20}$-arylalkyl radicals, especially $C_7$- to $C_{12}$-arylalkyl radicals.

Examples of the hydrocarbyl carboxylates mentioned are methyl formate, ethyl formate, n-propyl formate, isopropyl formate, n-butyl formate, sec-butyl formate, isobutyl formate, tert-butyl formate, methyl acetate, ethyl acetate, n-propyl acetate, isopropyl acetate, n-butyl acetate, sec-butyl acetate, isobutyl acetate, tert-butyl acetate, methyl propionate, ethyl propionate, n-propyl propionate, isopropyl propionate, n-butyl propionate, sec-butyl propionate, isobutyl propionate, tert-butyl propionate, methyl butyrate, ethyl butyrate, n-propyl butyrate, isopropyl butyrate, n-butyl butyrate, sec-butyl butyrate, isobutyl butyrate, tert-butyl butyrate, methyl cyclohexanecarboxylate, ethyl cyclohexanecarboxylate, n-propyl cyclohexanecarboxylate, isopropyl cyclohexanecarboxylate, n-butyl cyclohexanecarboxylate, sec-butyl cyclohexanecarboxylate, isobutyl cyclohexanecarboxylate, tert-butyl cyclohexanecarboxylate, methyl benzoate, ethyl benzoate, n-propyl benzoate, isopropyl benzoate, n-butyl benzoate, sec-butyl benzoate, isobutyl benzoate, tert-butyl benzoate, methyl phenylacetate, ethyl phenylacetate, n-propyl phenylacetate, isopropyl phenylacetate, n-butyl phenylacetate, sec-butyl phenylacetate, isobutyl phenylacetate and tert-butyl phenylacetate. Among the hydrocarbyl carboxylates mentioned, ethyl acetate has been found to be particularly advantageous as a donor for the iron halide-donor complexes, the aluminum trihalide-donor complexes or the alkylaluminum halide complexes, especially the aluminum trichloride-donor complexes.

In addition, particularly advantageous dihydrocarbyl ethers and hydrocarbyl carboxylates as donors for the iron halide-donor complexes, the aluminum trihalide-donor complexes or the alkylaluminum halide-donor complexes, especially the iron chloride-donor complexes or the aluminum trichloride-donor complexes, have been found to be those in which the donor compound has a total carbon number of 3 to 16, preferably of 4 to 16, especially of 4 to 12, in particular of 4 to 8. In the specific case of the dihydrocarbyl ethers, preference is given in particular to those having a total of 6 to 14 and especially 8 to 12 carbon atoms. In the specific case of the hydrocarbyl carboxylates, preference is given in particular to those having a total of 3 to 10 and especially 4 to 6 carbon atoms.

The molar ratio of the donor compounds mentioned to the iron halide, to the aluminum trihalide or to the alkylaluminum halide, especially to the iron chloride or to the aluminum trichloride, in the donor complex generally varies within the range from 0.3:1 to 1.5:1, especially from 0.5:1 to 1.2:1, in particular 0.7:1 to 1.1:1; in most cases it is 1:1. However, it is also possible to work with a greater excess of the donor compounds, often up to a 10-fold and especially 3-fold molar excess; the excess amount of donor compounds then acts additionally as a solvent or diluent.

Typically, the iron halide-donor complex, the aluminum trihalide-donor complex or the alkylaluminum halide-donor complex, especially the iron chloride-donor complex or the aluminum trichloride-donor complex, is prepared separately prior to the polymerization from the iron halide, the aluminum trihalide or the alkylaluminum halide, especially from anhydrous iron chloride or aluminum trichloride, and the donor compound, and is then—usually dissolved in an inert solvent such as a halogenated hydrocarbon, for example dichloromethane—added to the polymerization medium. However, the complex can also be prepared in situ prior to the polymerization.

In a preferred embodiment of the present invention, the polymerization is performed with additional use of a mono- or polyfunctional, especially mono-, di- or trifunctional, initiator which is selected from organic hydroxyl compounds, organic halogen compounds, protic acids and water. It is also possible to use mixtures of the initiators mentioned, for example mixtures of two or more organic hydroxyl compounds, mixtures of two or more organic halogen compounds, mixtures of one or more organic hydroxyl compounds and one or more organic halogen compounds, mixtures of one or more organic hydroxyl compounds and water, mixtures of one or more organic halogen compounds and water or mixtures of one or more protic acids and water. The initiator may be mono-, di- or polyfunctional, i.e. one, two or more hydroxyl groups or halogen atoms, which start the polymerization reaction, may be present in the initiator molecule. In the case of di- or polyfunctional initiators, telechelic isobutene polymers with two or more, especially two or three, polyisobutene chain ends are typically obtained.

Organic hydroxyl compounds which have only one hydroxyl group in the molecule and are suitable as monofunctional initiators include especially alcohols and phenols, in particular those of the general formula $R^5$—OH, in which $R^5$ denotes $C_1$- to $C_{20}$-alkyl radicals, especially $C_1$- to $C_8$-alkyl radicals, $C_5$- to $C_8$-cycloalkyl radicals, $C_6$- to $C_{20}$-aryl radicals, especially $C_6$- to $C_{12}$-aryl radicals, or $C_7$- to $C_{20}$-arylalkyl radicals, especially $C_7$- to $C_{12}$-arylalkyl radicals. In addition, the $R^5$ radicals may also comprise mixtures of the abovementioned structures and/or have other functional groups than those already mentioned, for example a keto function, a nitroxide or a carboxyl group, and/or heterocyclic structural elements.

Typical examples of such organic monohydroxyl compounds are methanol, ethanol, n-propanol, isopropanol, n-butanol, sec-butanol, isobutanol, tert-butanol, n-pentanol, n-hexanol, n-heptanol, n-octanol, 2-ethylhexanol, cyclohexanol, phenol, p-methoxyphenol, o-, m- and p-cresol, benzyl alcohol, p-methoxybenzyl alcohol, 1- and 2-phenylethanol, 1- and 2-(p-methoxyphenyl)ethanol, 1-, 2- and 3-phenyl-1-propanol, 1-, 2- and 3-(p-methoxyphenyl)-1-propanol, 1- and 2-phenyl-2-propanol, 1- and 2-(p-methoxyphenyl)-2-propanol, 1-, 2-, 3- and 4-phenyl-1-butanol, 1-, 2-, 3- and 4-(p-methoxyphenyl)-1-butanol, 1-, 2-, 3- and 4-phenyl-2-butanol, 1-, 2-, 3- and 4-(p-methoxyphenyl)-2-buta-nol, 9-methyl-9H-fluoren-9-ol, 1,1-diphenylethanol, 1,1-diphenyl-2-propyn-1-ol, 1,1-diphenylpropanol, 4-(1-hydroxy-1-phenylethyl)benzonitrile, cyclopropyldiphenylmethanol, 1-hydroxy-1,1-diphenylpropan-2-one, benzilic acid, 9-phenyl-9-fluorenol, triphenylmethanol, diphenyl(4-pyridinyl)methanol, alpha,alpha-diphenyl-2-pyridinemethanol, 4-methoxytrityl alcohol (especially polymer-bound as a solid phase), alpha-tert-butyl-4-chloro-4'-methylbenzhydrol, cyclohexyldiphenylmethanol, alpha-(p-tolyl)-benzhydrol, 1,1,2-triphenylethanol, alpha,alpha-diphenyl-2-pyridineethanol, alpha,alpha-4-pyridylbenzhydrol N-oxide, 2-fluorotriphenylmethanol, triphenylpropargyl alcohol, 4-[(diphenyl)hydroxymethyl]benzonitrile, 1-(2,6-dimethoxyphenyl)-2-methyl-1-phenyl-1-propanol, 1,1,2-triphenylpropan-1-ol and p-anisaldehyde carbinol.

Organic hydroxyl compounds which have two hydroxyl groups in the molecule and are suitable as bifunctional initiators are especially dihydric alcohols or diols having a total carbon number of 2 to 30, especially of 3 to 24, in particular of 4 to 20, and bisphenols having a total carbon number of 6 to 30, especially of 8 to 24, in particular of 10 to 20, for example ethylene glycol, 1,2- and 1,3-propylene glycol, 1,4-butylene glycol, 1,6-hexylene glycol, 1,2-, 1,3- or 1,4-bis(1-hydroxy-1-methylethyl)benzene (o-, m- or p-dicumyl alcohol), bisphenol A, 9,10-di-hydro-9,10-dimethyl-9,10-anthracenediol, 1,1-diphenylbutane-1,4-diol, 2-hydroxytriphenylcarbinol and 9-[2-(hydroxymethyl)phenyl]-9-fluorenol.

Organic halogen compounds which have one halogen atom in the molecule and are suitable as monofunctional initiators are in particular compounds of the general formula $R^6$-Hal in which Hal is a halogen atom selected from fluorine, iodine and especially chlorine and bromine, and $R^6$ denotes $C_1$- to $C_{20}$-alkyl radicals, especially $C_1$- to $C_8$-alkyl radicals, $C_5$- to $C_8$-cycloalkyl radicals or $C_7$- to $C_{20}$-arylalkyl radicals, especially $C_7$- to $C_{12}$-arylalkyl radicals. In addition, the $R^6$ radicals may also comprise mixtures of the abovementioned structures and/or have other functional groups than those already mentioned, for example a keto function, a nitroxide or a carboxyl group, and/or heterocyclic structural elements.

Typical examples of such monohalogen compounds are methyl chloride, methyl bromide, ethyl chloride, ethyl bromide, 1-chloropropane, 1-bromopropane, 2-chloropropane, 2-bromopropane, 1-chlorobutane, 1-bromobutane, sec-butyl chloride, sec-butyl bromide, isobutyl chloride, isobutyl bromide, tert-butyl chloride, tert-butyl bromide, 1-chloropentane, 1-bromopentane, 1-chlorohexane, 1-bromohexane, 1-chloroheptane, 1-bromoheptane, 1-chlorooctane, 1-bromooctane, 1-chloro-2-ethylhexane, 1-bromo-2-ethylhexane, cyclohexyl chloride, cyclohexyl bromide, benzyl chloride, benzyl bromide, 1-phenyl-1-chloroethane, 1-phenyl-1-bromoethane, 1-phenyl-2-chloroethane, 1-phenyl-2-bromoethane, 1-phenyl-1-chloropropane, 1-phenyl-1-bromopropane, 1-phenyl-2-chloropropane, 1-phenyl-2-bromopropane, 2-phenyl-2-chloropropane, 2-phenyl-2-bromopropane, 1-phenyl-3-chloropropane, 1-phenyl-3-bromopropane, 1-phenyl-1-chlorobutane, 1-phenyl-1-bromobutane, 1-phenyl-2-chlorobutane, 1-phenyl-2-bromobutane, 1-phenyl-3-chlorobutane, 1-phenyl-3-bromobutane, 1-phenyl-4-chlorobutane, 1-phenyl-4-bromobutane, 2-phenyl-1-chlorobutane, 2-phenyl-1-bromobutane, 2-phenyl-2-chlorobutane, 2-phenyl-2-bromobutane, 2-phenyl-3-chlorobutane, 2-phenyl-3-bromobutane, 2-phenyl-4-chlorobutane and 2-phenyl-4-bromobutane.

Organic halogen compounds which have two halogen atoms in the molecule and are suitable as difunctional initiators are, for example, 1,3-bis(1-bromo-1-methylethyl)benzene, 1,3-bis(2-chloro-2-propyl)benzene (1,3-dicumyl chloride) and 1,4-bis(2-chloro-2-propyl)benzene (1,4-dicumyl chloride).

The initiator is more preferably selected from organic hydroxyl compounds in which one or more hydroxyl groups are each bonded to an sp$^3$-hybridized carbon atom ("alcohols") or to an aromatic ring ("phenols"), organic halogen compounds, in which one or more halogen atoms are each bonded to an sp$^3$-hybridized carbon atom, protic acids and water. Among these, preference is given in particular to an initiator selected from organic hydroxyl compounds in which one or more hydroxyl groups are each bonded to an sp$^3$-hybridized carbon atom.

In the case of the organic halogen compounds as initiators, particular preference is further given to those in which the one or more halogen atoms are each bonded to a secondary or especially to a tertiary sp$^3$-hybridized carbon atom.

Preference is given in particular to initiators which bear, on such an sp$^3$-hybridized carbon atom, in addition to the hydroxyl group, the $R^{10}$, $R^{11}$ and $R^{12}$ radicals, which are each independently hydrogen, $C_1$- to $C_{20}$-alkyl, $C_5$- to $C_8$-cycloalkyl, $C_6$- to $C_{20}$-aryl, $C_7$- to $C_{20}$-alkylaryl or phenyl, where any aromatic ring may also bear one or more, preferably one two, $C_1$- to $C_4$-alkyl, $C_1$- to $C_4$-alkoxy, $C_1$- to $C_4$-hydroxyalkyl or $C_{11}$- to $C_4$-haloalkyl radicals as substituents, where not more than one of the variables $R^{10}$, $R^{11}$ and $R^{12}$ is hydrogen and at least one of the variables $R^{10}$, $R^{11}$ and $R^{12}$ is phenyl which may also bear one or more, preferably one or two, to $C_1$- to $C_4$-alkyl, $C_1$- to $C_4$-alkoxy, $C_1$- to $C_4$-hydroxyalkyl or $C_1$- to $C_4$-haloalkyl radicals as substituents.

Examples of useful protic acids include hydrochloric acid, hydrobromic acid, hydrofluoric acid, sulfuric acid, hydrocyanic acid and mixtures thereof. However, the protic acids used may also be protonated ethers.

For the present invention, very particular preference is given to initiators selected from water, one or more protic acids, methanol, ethanol, 1-phenylethanol, 1-(p-methoxy-phenyl)ethanol, n-propanol, isopropanol, 2-phenyl-2-propanol (cumene), n-butanol, isobutanol, sec-butanol, tert-butanol, 1-phenyl-1-chloroethane, 2-phenyl-2-chloropropane (cumyl chloride), tert-butyl chloride and 1,3- or 1,4-bis(1-hydroxy-1-methylethyl)benzene and mixtures thereof. Among these, preference is given in particular to initiators selected from water, one or more protic acids, methanol, ethanol, 1-phenylethanol, 1-(p-methoxy-phenyl)ethanol, n-propanol, isopropanol, 2-phenyl-2-propanol (cumene), n-butanol, isobutanol, sec-butanol, tert-butanol, 1-phenyl-1-chloroethane and 1,3- or 1,4-bis(1-hydroxy-1-methylethyl)benzene and mixtures thereof.

The molar ratio of the initiators mentioned to the isobutene monomer used in the case of homopolymerization of isobutene, or to the total amount of the polymerizable monomers used in the case of copolymerization of isobutene, based on each individual functional site of the initiator, according to embodiment (A) is generally 0.0005:1 to 0.1:1, especially 0.001:1 to 0.075:1, in particular 0.0025:1 to 0.05:1. When water is used as the sole initiator or in combination with organic hydroxyl compounds and/or organic halogen compounds as further initiators, the molar ratio of water to the isobutene monomer used in the case of homopolymerization of isobutene, or to the total amount of the polymerizable monomers used in the case of copolymerization of isobutene is especially 0.0001:1 to 0.1:1, in particular 0.0002:1 to 0.05:1.

A proportion of the initiator molecules added as organic hydroxyl or halogen compounds is incorporated into the polymer chains in embodiment (A). The proportion ($I_{eff}$) of polymer chains which are started by such an incorporated organic initiator molecule may be up to 100%, and is generally 5 to 90%. The remaining polymer chains arise either from water originating from traces of moisture as an initiator molecule, or from chain transfer reactions.

In a further preferred embodiment of the present invention, the polymerization is performed in the presence of 0.01 to 10 mmol, especially of 0.05 to 5.0 mmol, in particular of 0.1 to 1.0 mmol, based in each case on 1 mol of isobutene monomer used in the case of homopolymerization of isobutene, or on 1 mol of the total amount of the polymerizable monomers used in the case of copolymerization of isobutene, of a basic nitrogen compound.

Such a basic nitrogen compound used may be an aliphatic, cycloaliphatic or aromatic amine of the general formula $R^7$—$NR^8R^9$, or else ammonia, in which the variables $R^7$, $R^8$ and $R^9$ are each independently hydrogen, $C_1$- to $C_{20}$-alkyl radicals, especially $C_1$- to $C_8$-alkyl radicals, $C_5$- to $C_8$-cycloalkyl radicals, $C_6$- to $C_{20}$-aryl radicals, especially $C_6$- to $C_{12}$-aryl radicals, or $C_7$- to $C_{20}$-arylalkyl radicals, especially $C_7$- to $C_{12}$-arylalkyl radicals. When none of these variables is hydrogen, the amine is a tertiary amine. When one of these variables is hydrogen, the amine is a secondary amine. When two of these variables is hydrogen, the amine is a primary amine. When all these variables are hydrogen, the amine is ammonia.

Typical examples of such amines of the general formula $R^7$—$NR^8R^9$ are methylamine, ethylamine, n-propylamine, isopropylamine, n-butylamine, tert-butylamine, sec-butylamine, isobutylamine, tert-amylamine, n-hexylamine, n-heptylamine, n-octylamine, 2-ethylhexylamine, cyclopentylamine, cyclohexylamine, aniline, dimethylamine, diethylamine, di-n-propylamine, diisopropylamine, di-n-butylamine, di-tert-butylamine, di-sec-butylamine, diisobutylamine, di-tert-amylamine, di-n-hexylamine, di-n-heptylamine, di-n-octylamine, di-(2-ethylhexyl)amine, dicyclopentylamine, dicyclohexylamine, diphenylamine, trimethylamine, triethylamine, tri-n-propylamine, tri-isopropylamine, tri-n-butylamine, tri-tert-butylamine, tri-sec-butylamine, tri-isobutylamine, tri-tert-amylamine, tri-n-hexylamine, tri-n-heptylamine, tri-n-octylamine, tri-(2-ethylhexyl)amine, tricyclopentylamine, tricyclohexylamine, triphenylamine, dimethylethylamine, methyl-n-butylamine, N-methyl-N-phenylamine, N,N-dimethyl-N-phenylamine, N-methyl-N,N-diphenylamine or N-methyl-N-ethyl-N-n-butylamine.

In addition, such a basic nitrogen compound used may also be a compound having a plurality of, especially having two or three, nitrogen atoms and having 2 to 20 carbon atoms, where these nitrogens may each independently bear hydrogen atoms or aliphatic, cycloaliphatic or aromatic substituents. Examples of such polyamines are 1,2-ethylenediamine, 1,3-propylenediamine, 1,4-butylenediamine, diethylenetriamine, N-methyl-1,2-ethylenediamine, N,N-dimethyl-1,2-ethylenediamine, N,N'-dimethyl-1,2-ethylenediamine or N,N-dimethyl-1,3-propylenediamine.

However, a suitable basic nitrogen compound of this kind is especially a saturated, partly unsaturated or unsaturated nitrogen-containing five-membered or six-membered heterocyclic ring which comprises one, two or three ring nitrogen atoms and may have one or two further ring heteroatoms from the group of oxygen and sulfur and/or hydrocarbyl radicals, especially $C_1$- to $C_4$-alkyl radicals and/or phenyl, and/or functional groups or heteroatoms as substituents, especially fluorine, chlorine, bromine, nitro and/or cyano, for example pyrrolidine, pyrrole, imidazole, 1,2,3- or 1,2,4-triazole, oxazole, thiazole, piperidine, pyrazane, pyrazole, pyridazine, pyrimidine, pyrazine, 1,2,3-, 1,2,4- or 1,2,5-triazine, 1,2,5-oxathiazine, 2H-1,3,5-thiadiazine or morpholine.

However, a very particularly suitable basic nitrogen compound of this kind is pyridine or a derivative of pyridine (especially a mono-, di- or tri-$C_1$- to $C_4$-alkyl-substituted pyridine) such as 2-, 3-, or 4-methylpyridine (picolines), 2,3-, 2,4-, 2,5-, 2,6-, 3,4-, 3,5- or 3,6-dimethylpyridine (lutidines), 2,4,6-trimethylpyridine (collidine), 2-, 3,- or 4-tert-butylpyridine, 2-tert-butyl-6-methylpyridine, 2,4-, 2,5-, 2,6- or 3,5-di-tert-butylpyridine or else 2-, 3,- or 4-phenylpyridine.

It is possible to use a single basic nitrogen compound or mixtures of such basic nitrogen compounds.

The polymerization methods essential to the invention, which has been specified for the present invention, for isobutene or isobutene-comprising monomer mixtures according to embodiment (B) is described hereinafter.

Isobutene homopolymers are understood in the context of the present invention to mean those polymers which, based on the polymer, are formed from isobutene to an extent of at least 98 mol %, preferably to an extent of at least 99 mol %. Accordingly, isobutene copolymers are understood to mean those polymers which comprise more than 2 mol % of copolymerized monomers other than isobutene, for example linear butenes.

In the context of the present invention, the following definitions apply to generically defined radicals:

A $C_1$- to $C_8$-alkyl radical is a linear or branched alkyl radical having 1 to 8 carbon atoms. Examples thereof are methyl, ethyl, n-propyl, isopropyl, n-butyl, 2-butyl, isobutyl, tert-butyl, pentyl, 1-methylbutyl, 2-methylbutyl, 3-methylbutyl, 2,2-dimethylpropyl, 1-ethylpropyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, n-octyl and the constitutional isomers thereof, such as 2-ethylhexyl. Such $C_1$- to $C_8$-alkyl radicals may to a small extent also comprise heteroatoms such as oxygen, nitrogen or halogen atoms, e.g. chlorine or fluorine, and/or aprotic functional groups, for example carboxyl ester groups, cyano groups or nitro groups.

A $C_1$- to $C_{20}$-alkyl radical is a linear or branched alkyl radical having 1 to 20 carbon atoms. Examples thereof are the abovementioned $C_1$- to $C_8$-alkyl radicals, and additionally n-nonyl, isononyl, n-decyl, 2-propylheptyl, n-undecyl, n-dodecyl, n-tridecyl, isotridecyl, n-tetradecyl, n-hexadecyl, n-octadecyl and n-eicosyl. Such $C_1$- to $C_{20}$-alkyl radicals may to a small extent also comprise heteroatoms such as oxygen, nitrogen or halogen atoms, e.g. chlorine or fluorine, and/or aprotic functional groups, for example carboxyl ester groups, cyano groups or nitro groups.

A $C_1$- to $C_{20}$-haloalkyl radical or a $C_1$- to $C_8$-haloalkyl radical is a radical with the base skeletons specified above for $C_1$- to $C_{20}$-alkyl radicals or $C_1$- to $C_8$-alkyl radicals, but in which the hydrogen atoms have been replaced to a relatively high degree by halogen atoms, especially by fluorine and/or chlorine atoms. Preferably all or virtually all hydrogen atoms have been replaced by halogen atoms, especially by fluorine and/or chlorine atoms. Typical examples of such radicals are $C_1$- to $C_4$-alkyl radicals in which at least 60%, especially at least 75%, in particular at least 90%, of the number of the hydrogen atoms have been replaced by fluorine and/or chlorine atoms, for example dichloromethyl, trichloromethyl, difluoromethyl, trifluoromethyl, chlorodifluoromethyl, fluorodichloromethyl, pentachloroethyl or pentafluoroethyl.

A $C_5$- to $C_8$-cycloalkyl radical is a saturated cyclic radical which may comprise alkyl side chains. Examples thereof are cyclopentyl, 2- or 3-methylcyclopentyl, 2,3-, 2,4- or 2,5-dimethylcyclopentyl, cyclohexyl, 2-, 3- or 4-methylcyclohexyl, 2,3-, 2,4-, 2,5-, 2,6-, 3,4-, 3,5- or 3,6-dimethylcyclohexyl, cycloheptyl, 2-, 3- or 4-methylcycloheptyl, cyclooctyl, 2-, 3-, 4- or 5-methylcyclooctyl. Such $C_5$- to $C_8$-cycloalkyl radicals may to a small extent also comprise heteroatoms such as oxygen, nitrogen or halogen atoms, e.g. chlorine or fluorine, and/or aprotic functional groups, for example carboxyl ester groups, cyano groups or nitro groups.

A $C_6$- to $C_{20}$-aryl radical or a $C_6$- to $C_{12}$-aryl radical is preferably optionally substituted phenyl, optionally substituted naphthyl, optionally substituted anthracenyl or optionally substituted phenanthrenyl. Such aryl radicals may be a 1 to 5 aprotic substituents or aprotic functional groups, for example $C_1$- to $C_8$-alkyl, $C_1$- to $C_8$-haloalkyl such as $C_1$- to $C_8$-chloroalkyl or $C_1$- to $C_8$-fluoroalkyl, halogens such as chlorine or fluorine, nitro, cyano or phenyl. Examples of such aryl radicals are phenyl, naphthyl, biphenyl, anthracenyl, phenanthrenyl, tolyl, nitrophenyl, chlorophenyl, dichlorophenyl, pentafluorophenyl, pentachlorophenyl, (trifluoromethyl)phenyl, bis(tri-fluoromethyl)phenyl, (trichloro)methylphenyl and bis(trichloromethyl)phenyl.

A $C_7$- to $C_{20}$-arylalkyl radical or a $C_7$- to $C_{12}$-arylalkyl radical is preferably optionally substituted $C_1$- to $C_4$-alkylphenyl such as benzyl, o-, m- or p-methylbenzyl, 1- or 2-phenylethyl, 1-, 2- or 3-phenylpropyl or 1-, 2-, 3- or 4-phenylbutyl, optionally substituted $C_1$- to $C_4$-alkylnaphthyl such as naphthylmethyl, optionally substituted $C_1$- to $C_4$-alkylanthracenyl such as anthracenylmethyl, or optionally substituted $C_1$- to $C_4$-alkylphenanthrenyl such as phenanthrenylmethyl. Such arylalkyl radicals may bear 1 to 5 aprotic substituents or aprotic functional groups, especially on the aryl moiety, for example $C_1$- to $C_8$-alkyl, $C_1$- to $C_8$-haloalkyl such as $C_1$- to $C_8$-chloroalkyl or $C_1$- to $C_8$-fluoroalkyl, halogen such as chlorine or fluorine, nitro or phenyl.

The process according to the invention for preparation of high-reactivity isobutene homo- or copolymers generally proceeds—caused by the use of the complex which is effective as a polymerization catalyst and is formed from at least one Lewis acid and optionally at least one donor and the initiators described—by a cationic reaction mechanism.

The feature essential to the invention is the use of an organic sulfonic acid of the general formula Z—$SO_3H$ as at least one initiator in the polymerization process according to the invention. It will be appreciated that it is also possible to use mixtures of different sulfonic acids Z—$SO_3H$. In addition to these sulfonic acid initiators, it is also possible to use further initiator molecules from other chemical substance classes.

The variable Z preferably represents a $C_1$- to $C_8$-alkyl radical, to $C_8$-haloalkyl radical, $C_5$- to $C_8$-cycloalkyl radical, $C_6$- to $C_{12}$-aryl radical or a $C_7$- to $C_{12}$-arylalkyl radical. Z more preferably represents a $C_1$- to $C_4$-alkyl radical, a $C_1$- to $C_4$-haloalkyl radical, an optionally substituted phenyl radical, e.g. a tolyl radical or a xylyl radical, or an optionally substituted $C_1$- to $C_4$-alkylphenyl radical, e.g. a benzyl radical.

In a particularly preferred embodiment of the present invention, the at least one initiator used is an organic sulfonic acid selected from methanesulfonic acid, trifluoromethanesulfonic acid, trichloromethanesulfonic acid and toluenesulfonic acid, or mixtures thereof.

Suitable Lewis acids as a polymerization catalyst or in the complex effective as a polymerization catalyst are in principle all inorganic molecules identified as Lewis acids by definition, but especially halogen compounds of metals and semimetals of the Periodic Table of the Elements whose valences are fully satisfied by halogen atoms or which, in addition to the halogen substituents, also bear one or more organic carbon radicals—especially $C_1$- to $C_4$-alkyl radicals. Useful halogen substituents in these element halides and alkyl element halides here include iodine, bromine and especially fluorine and in particular chlorine. It is of course also possible to use mixtures of those element halides or of those alkyl element halides with one another in each case and also with each other.

If, for example, the halides or alkyl halides of aluminum are used as such Lewis acids, the following species can typically be used: aluminum trifluoride, aluminum trichloride, aluminum tribromide; as alkylaluminum halides, mono ($C_1$- to $C_4$-aralkyl)aluminum dihalides or di($C_1$- to $C_4$-alkyl) aluminum monohalide such as methylaluminum dichloride, ethylaluminum dichloride, dimethylaluminum chloride or diethylaluminum chloride.

In a preferred embodiment, the Lewis acid used for the polymerization catalyst or the complex effective as a polymerization catalyst is at least one compound selected from the binary chlorine and fluorine compounds of the elements of transition groups 1 to 8 and of main groups 3 to 5 of the Periodic Table, and the binary chlorine compounds may be preferable over the binary fluorine compounds of these elements.

Typical binary chlorine compounds of this kind are $ScCl_3$, $YCl_3$, $YbCl_3$, $TiCl_3$, $TiCl_4$, $ZrCl_4$, $HfCl_4$, $YCl_3$, $VCl_4$, $NbCl_3$, $NbCl_5$, $TaCl_5$, $CrCl_2$, $CrO_3$, $MoCl_3$, $MOCl_5$, $WCl_5$, $WCl_6$, $MnCl_2$, $ReCl_3$, $ReCl_5$, $FeCl_2$, $FeCl_3$, $RuCl_3$, $OsCl_3$, $CoCl_2$, $CoCl_3$, $RhCl_3$, $IrCl_3$, $NiCl_2$, $PdCl_2$, $PtCl_2$, $CuCl$, $CuCl_2$, $AgCl$, $AuCl$, $ZnCl_2$, $CdCl_2$, $HgCl$, $HgCl_2$, $BCl_3$, $AlCl_3$, $GaCl_3$, $InCl_3$, $TlCl_3$, $SiCl_4$, $GeCl_4$, $SnCl_2$, $SnCl_3$, $SnCl_4$, $PbCl_2$, $PbCl_4$, $PCl_3$, $PCl_5$, $AsCl_3$, $SbCl_3$, $SbCl_5$ and $BiCl_3$. Particular preference among these is given to $BCl_3$, $AlCl_3$, $TiCl_4$, $FeCl_2$, $FeCl_3$ and $ZnCl_2$.

Typical binary fluorine compounds of this kind are $ScF_3$, $YF_3$, $YbF_3$, $TiF_3$, $TiF_4$, $ZrF_4$, $HfF_4$, $VF_3$, $VF_4$, $NbF_3$, $NbF_5$, $TaF_5$, $CrF_2$, $CrF_3$, $MoF_3$, $MoF_5$, $WF_5$, $WF_6$, $MnF_2$, $ReF_3$, $ReF_5$, $FeF_2$, $FeF_3$, $RuF_3$, $OsF_3$, $CoF_2$, $CoF_3$, $RhF_3$, $IrF_3$, $NiF_2$, $PdF_2$, $PtF_2$, $CuF$, $CuF_2$, $AgF$, $AuF$, $ZnF_2$, $CdF_2$, $HgF$, $HgF_2$, $BF_3$, $AlF_3$, $GaF_3$, $InF_3$, $TlF_3$, $SiF_4$, $GeF_4$, $SnF_2$, $SnF_3$, $SnF_4$, $PbF_2$, $PbF_4$, $PF_3$, $PF_5$, $AsF_3$, $SbF_3$, $SbF_5$ and $BiF_3$. Among these, particular preference is given to $BF_3$, $AlF_3$, $TiF_4$, $FeF_2$, $FeF_3$ and $ZnF_2$. It is also possible to use mixtures of binary chlorine and fluorine compounds.

It is often also possible to use binary bromine compounds as Lewis acids of this kind; such bromine compounds are, for example: $TiBr_3$, $TiBr_4$, $ZrBr_4$, $VBr_3$, $VBr_4$, $CrBr_2$, $CrBr_3$, $MoBr_3$, $MoBr_5$, $WBr_5$, $WBr_6$, MnBr2, $FeBr_2$, $FeBr_3$, $CoBr_2$, $CoBr_3$, $NiBr_2$, $PdBr_2$, $PtBr_2$, $CuBr$, $CuBr_2$, $AgBr$, $AuBr$, $ZnBr_2$, $CdBr_2$, $HgBr$, $HgBr_2$, $BBr_3$, $AlBr_3$, $SiBr_4$, $SnBr_2$, $SnBr_3$, $SnBr_4$, $PbBr_2$, $PbBr_4$, $PBr_3$, $PBr_5$, $AsBr_3$, $SbBr_3$, $SbBr_5$ and $BiBr_3$.

Very particular preference is given to using the preferred sulfonic acid initiators methanesulfonic acid, trifluoromethanesulfonic acid, trichloromethanesulfonic acid and toluenesulfonic acid together with the preferred Lewis acids or Lewis acid complexes with $BCl_3$, $AlCl_3$, $TiCl_4$, $FeCl_2$, $FeCl_3$, $ZnCl_2$, $BF_3$, $AlF_3$, $TIF_4$, $FeF_2$, $FeF_3$ and/or $ZnF_2$, in particular methanesulfonic acid together with $AlCl_3$, $BF_3$ or $FeCl_3$, especially when Lewis acid complexes which comprise the dihydrocarbyl ethers of the general formula $R^1$—O—$R^2$ and/or hydrocarbyl carboxylates of the general formula $R^3$—$COOR^4$ specified below as preferred as donors are used.

In the process according to the invention, preference is given to using a complex which is effective as a polymerization catalyst and comprises, as the donor, an organic compound with at least one ether function or a carboxylic ester function. It is of course also possible to use mixtures of different organic compounds with at least one ether function and/or of different organic compounds with at least one carboxylic ester function. If the complex effective as a polymerization catalyst comprises, as the donor, an organic compound with at least one ether function, compounds with at least one ether function are also understood to mean acetals and hemiacetals.

In a preferred embodiment of the present invention, a complex which is effective as a polymerization catalyst and is formed from at least one Lewis acid and at least one donor is used, in which the organic compound which functions as the donor is a dihydrocarbyl ether of the general formula $R^1$—O—$R^2$ in which the variables $R^1$ and $R^2$ are each independently $C_1$- to $C_{20}$-alkyl radicals, especially $C_1$- to $C_8$ alkyl radicals, $C_5$- to $C_8$-cycloalkyl radicals, $C_6$- to $C_{20}$-aryl radicals, especially $C_6$- to $C_{12}$ aryl radicals, or $C_7$- to $C_{20}$-arylalkyl radicals, especially $C_7$- to $C_{12}$-arylalkyl radicals, or a hydrocarbyl carboxylate of the general formula $R^3$—$COOR^4$ in which the variables $R^3$ and $R^4$ are each independently $C_1$- to $C_{20}$-alkyl radicals, especially $C_1$- to $C_8$ alkyl radicals, $C_5$- to $C_8$-cycloalkyl radicals, $C_6$- to $C_{20}$-aryl radicals, especially $C_6$- to $C_{12}$ aryl radicals, or $C_7$- to $C_{20}$-arylalkyl radicals, especially $C_7$- to $C_{12}$-arylalkyl radicals.

The dihydrocarbyl ethers mentioned may be open-chain or cyclic, where the two variables $R^1$ and $R^2$ in the case of the cyclic ethers may join to form a ring, where such rings may also comprise two or three ether oxygen atoms. Examples of such open-chain and cyclic dihydrocarbyl ethers are dimethyl ether, diethyl ether, di-n-propyl ether, diisopropyl ether, di-n-butyl ether, di-sec-butyl ether, diisobutyl ether, di-n-pentyl ether, di-n-hexyl ether, di-n-heptyl ether, di-n-octyl ether, di-(2-ethylhexyl) ether, methyl n-butyl ether, methyl sec-butyl ether, methyl isobutyl ether, methyl tert-butyl ether, ethyl n-butyl ether, ethyl sec-butyl ether, ethyl isobutyl ether, n-propyl-n-butyl ether, n-propyl sec-butyl ether, n-propyl isobutyl ether, n-propyl tert-butyl ether, isopropyl n-butyl ether, isopropyl sec-butyl ether, isopropyl isobutyl ether, isopropyl tert-butyl ether, methyl n-hexyl ether, methyl n-octyl ether, methyl 2-ethylhexyl ether, ethyl n-hexyl ether, ethyl n-octyl ether, ethyl 2-ethylhexyl ether, n-butyl n-octyl ether, n-butyl 2-ethylhexyl ether, tetrahydrofuran, tetrahydropyran, 1,2-, 1,3- and 1,4-dioxane, dicyclohexyl ether, diphenyl ether, ditolyl ether, dixylyl ether and dibenzyl ether. Among the dihydrocarbyl ethers mentioned, di-n-butyl ether and diphenyl ether have been found to be particularly advantageous here as donors, especially in combination with the Lewis acids $BCl_3$, $AlCl_3$, $TiCl_4$, $FeCl_2$, $FeCl_3$ and $ZnCl_2$.

Examples of the hydrocarbyl carboxylates mentioned are methyl formate, ethyl formate, n-propyl formate, isopropyl formate, n-butyl formate, sec-butyl formate, isobutyl formate, tert-butyl formate, methyl acetate, ethyl acetate, n-propyl acetate, isopropyl acetate, n-butyl acetate, sec-butyl acetate, isobutyl acetate, tert-butyl acetate, methyl propionate, ethyl propionate, n-propyl propionate, isopropyl propionate, n-butyl propionate, sec-butyl propionate, isobutyl propionate, tert-butyl propionate, methyl butyrate, ethyl butyrate, n-propyl butyrate, isopropyl butyrate, n-butyl butyrate, sec-butyl butyrate, isobutyl butyrate, tert-butyl butyrate, methyl cyclohexanecarboxylate, ethyl cyclohexanecarboxylate, n-propyl cyclohexanecarboxylate, isopropyl cyclohexanecarboxylate, n-butyl cyclohexanecarboxylate, sec-butyl cyclohexanecarboxylate, isobutyl cyclohexanecarboxylate, tert-butyl cyclohexanecarboxylate, methyl benzoate, ethyl benzoate, n-propyl benzoate, isopropyl benzoate, n-butyl benzoate, sec-butyl benzoate, isobutyl benzoate, tert-butyl benzoate, methyl phenylacetate, ethyl phenylacetate, n-propyl phenylacetate, isopropyl phenylacetate, n-butyl phenylacetate, sec-butyl phenylacetate, isobutyl phenylacetate and tert-butyl phenylacetate. Among the hydrocarbyl carboxylates mentioned, ethyl acetate has been found to be particularly advantageous here as a donor, especially in combination with the Lewis acids $BCl_3$, $AlCl_3$, $TiCl_4$, $FeCl_2$, $FeCl_3$ and $ZnCl_2$.

In addition, particularly advantageous dihydrocarbyl ethers and hydrocarbyl carboxylates as donors, especially in combination with the Lewis acids $BCl_3$, $AlCl_3$, $TiCl_4$, $FeCl_2$, $FeCl_3$ and $ZnCl_2$, have been found to be those in which the donor compound has a total carbon number of 3 to 16, preferably of 4 to 16, especially of 4 to 12, in particular of 4 to 8. In the specific case of the dihydrocarbyl ethers, preference is given in particular to those having a total of 6 to 14 and especially 8 to 12 carbon atoms. In the specific case of the hydrocarbyl carboxylates, preference is given in particular to those having a total of 3 to 10 and especially 4 to 6 carbon atoms.

The molar ratio of the donor compounds mentioned to the Lewis acids, i.e. specifically to the element halides and element alkyl halides mentioned, especially to the Lewis acids $BCl_3$, $AlCl_3$, $TiCl_4$, $FeCl_2$, $FeCl_3$ and $ZnCl_2$, in the complex effective as a polymerization catalyst generally varies within the range from 0.3:1 to 1.5:1, especially from 0.5:1 to 1.2:1, in particular 0.7:1 to 1.1:1; in most cases it is 1:1. However, it is also possible to work with a greater excess of the donor compounds, often up to a 10-fold and especially 3-fold molar excess; the excess amount of donor compounds then acts additionally as a solvent or diluent.

Typically, the complex effective as a polymerization catalyst is prepared separately prior to the polymerization from the Lewis acid(s) mentioned, which is/are generally used in anhydrous form, and the donor compound(s), and is then—usually dissolved in an inert solvent such as a halogenated hydrocarbon, for example dichloromethane—added to the polymerization medium. However, the complex can also be prepared in situ prior to the polymerization.

In a preferred embodiment of the present invention, the polymerization is performed with additional use of at least one further initiator which is mono- or polyfunctional, especially mono-, di- or trifunctional, and is selected from organic hydroxyl compounds, organic halogen compounds, protic acids and water. It is also possible to use mixtures of such further initiators, for example mixtures of two or more organic hydroxyl compounds, mixtures of two or more organic halogen compounds, mixtures of one or more organic hydroxyl compounds and one or more organic halogen compounds, mixtures of one or more organic hydroxyl compounds and water, mixtures of one or more organic halogen compounds and water or mixtures of one or more protic acids and water. The initiator may be mono-, di- or polyfunctional, i.e. one, two or more hydroxyl groups or halogen atoms, which start the polymerization reaction, may be present in the initiator molecule. In the case of di- or polyfunctional initiators, telechelic isobutene polymers with two or more, especially two or three, polyisobutene chain ends are typically obtained.

Organic hydroxyl compounds which have only one hydroxyl group in the molecule and are suitable as monofunctional initiators include especially alcohols and phenols, in particular those of the general formula $R^5$—OH, in which $R^5$ denotes $C_1$- to $C_{20}$-alkyl radicals, especially $C_1$- to $C_8$-alkyl radicals, $C_5$- to $C_8$-cycloalkyl radicals, $C_6$- to $C_{20}$-aryl radicals, especially $C_6$- to $C_{12}$-aryl radicals, or $C_7$- to $C_{20}$-arylalkyl radicals, especially $C_7$- to $C_{12}$-arylalkyl radicals. In addition, the $R^5$ radicals may also comprise mixtures of the abovementioned structures and/or have other functional groups than those already mentioned, for example a keto function, a nitroxide or a carboxyl group, and/or heterocyclic structural elements.

Typical examples of such organic monohydroxyl compounds are methanol, ethanol, n-propanol, isopropanol, n-butanol, sec-butanol, isobutanol, tert-butanol, n-pentanol, n-hexanol, n-heptanol, n-octanol, 2-ethylhexanol, cyclohexanol, phenol, p-methoxyphenol, o-, m- and p-cresol, benzyl alcohol, p-methoxybenzyl alcohol, 1- and 2-phenylethanol, 1- and 2-(p-methoxyphenyl)ethanol, 1-, 2- and 3-phenyl-1-propanol, 1-, 2- and 3-(p-methoxyphenyl)-1-propanol, 1- and 2-phenyl-2-propanol, 1- and 2-(p-methoxyphenyl)-2-propanol, 1-, 2-, 3- and 4-phenyl-1-butanol, 1-, 2-, 3- and 4-(p-methoxyphenyl)-1-butanol, 1-, 2-, 3- and 4-phenyl-2-butanol, 1-, 2-, 3- and 4-(p-methoxyphenyl)-2-butanol, 9-methyl-9H-fluoren-9-ol, 1,1-diphenylethanol, 1,1-diphenyl-2-propyn-1-ol, 1,1-diphenylpropanol, 4-(1-hydroxy-1-phenylethyl)benzonitrile, cyclopropyldiphenylmethanol, 1-hydroxy-1,1-diphenylpropan-2-one, benzilic acid, 9-phenyl-9-fluorenol, triphenylmethanol, diphenyl(4-pyridinyl) methanol, alpha,alpha-diphenyl-2-pyridinemethanol, 4-methoxytrityl alcohol (especially polymer-bound as a solid phase), alpha-tert-butyl-4-chloro-4'-methylbenzhydrol, cyclohexyldiphenylmethanol, alpha-(p-tolyl)-benzhydrol, 1,1,2-triphenylethanol, alpha,alpha-diphenyl-2-pyridineethanol, alpha,alpha-4-pyridylbenzhydrol N-oxide, 2-fluorotriphenylmethanol, triphenylpropargyl alcohol, 4-[(diphenyl)hydroxymethyl]benzonitrile, 1-(2,6-dimethoxyphenyl)-2-methyl-1-phenyl-1-propanol, 1,1,2-triphenylpropan-1-ol and p-anisaldehyde carbinol.

Organic hydroxyl compounds which have two hydroxyl groups in the molecule and are suitable as bifunctional initiators are especially dihydric alcohols or diols having a total carbon number of 2 to 30, especially of 3 to 24, in particular of 4 to 20, and bisphenols having a total carbon number of 6 to 30, especially of 8 to 24, in particular of 10 to 20, for example ethylene glycol, 1,2- and 1,3-propylene glycol, 1,4-butylene glycol, 1,6-hexylene glycol, 1,2-, 1,3- or 1,4-bis(1-hydroxy-1-methylethyl)benzene (o-, m- or p-dicumyl alcohol), bisphenol A, 9,10-di-hydro-9,10-dimethyl-9,10-anthracenediol, 1,1-diphenylbutane-1,4-diol, 2-hydroxytriphenylcarbinol and 9-[2-(hydroxymethyl)phenyl]-9-fluorenol.

Organic halogen compounds which have one halogen atom in the molecule and are suitable as monofunctional initiators are in particular compounds of the general formula $R^6$-Hal in which Hal is a halogen atom selected from fluorine, iodine and especially chlorine and bromine, and $R^6$ denotes $C_1$- to $C_{20}$-alkyl radicals, especially $C_1$- to $C_8$-alkyl radicals, $C_5$- to $C_8$-cycloalkyl radicals or $C_7$- to $C_{20}$-arylalkyl radicals, especially $C_7$- to $C_{12}$-arylalkyl radicals. In addition, the $R^6$ radicals may also comprise mixtures of the abovementioned structures and/or have other functional groups than those already mentioned, for example a keto function, a nitroxide or a carboxyl group, and/or heterocyclic structural elements.

Typical examples of such monohalogen compounds are methyl chloride, methyl bromide, ethyl chloride, ethyl bromide, 1-chloropropane, 1-bromopropane, 2-chloropropane, 2-bromopropane, 1-chlorobutane, 1-bromobutane, sec-butyl chloride, sec-butyl bromide, isobutyl chloride, isobutyl bromide, tert-butyl chloride, tert-butyl bromide, 1-chloropentane, 1-bromopentane, 1-chlorohexane, 1-bromohexane, 1-chloroheptane, 1-bromoheptane, 1-chlorooctane, 1-bronnooctane, 1-chloro-2-ethylhexane, 1-bromo-2-ethylhexane, cyclohexyl chloride, cyclohexyl bromide, benzyl chloride, benzyl bromide, 1-phenyl-1-chloroethane, 1-phenyl-1-bromoethane, 1-phenyl-2-chloroethane, 1-phenyl-2-bromoethane, 1-phenyl-1-chloropropane, 1-phenyl-1-bromopropane, 1-phenyl-2-chloropropane, 1-phenyl-2-bromopropane, 2-phenyl-2-chloropropane, 2-phenyl-2-bromopropane, 1-phenyl-3-chloropropane, 1-phenyl-3-bromopropane, 1-phenyl-1-chlorobutane, 1-phenyl-1-bromobutane, 1-phenyl-2-chlorobutane, 1-phenyl-2-bromobutane, 1-phenyl-3-chlorobutane, 1-phenyl-3-bromobutane, 1-phenyl-4-chlorobutane, 1-phenyl-4-bromobutane, 2-phenyl-1-chlorobutane, 2-phenyl-1-bromobutane, 2-phenyl-2-chlorobutane, 2-phenyl-2-bromobutane, 2-phenyl-3-chlorobutane, 2-phenyl-3-bromobutane, 2-phenyl-4-chlorobutane and 2-phenyl-4-bromobutane.

Organic halogen compounds which have two halogen atoms in the molecule and are suitable as difunctional initiators are, for example, 1,3-bis(1-bromo-1-methylethyl) benzene, 1,3-bis(2-chloro-2-propyl)benzene (1,3-dicumyl chloride) and 1,4-bis(2-chloro-2-propyl)benzene (1,4-dicumyl chloride).

The further initiator is more preferably selected from organic hydroxyl compounds in which one or more hydroxyl groups are each bonded to an spa-hybridized carbon atom, organic halogen compounds, in which one or more halogen atoms are each bonded to an $sp^3$-hybridized carbon atom, protic acids and water. Among these, preference is given in particular to an initiator selected from organic hydroxyl compounds in which one or more hydroxyl groups are each bonded to an $sp^3$-hybridized carbon atom.

In the case of the organic halogen compounds as further initiators, particular preference is further given to those in which the one or more halogen atoms are each bonded to a secondary or especially to a tertiary $sp^3$-hybridized carbon atom.

Preference is given in particular to further initiators which bear, on such an $sp^3$-hybridized carbon atom, in addition to the hydroxyl group, the $R^5$, $R^6$ and $R^7$ radicals, which are each independently hydrogen, $C_1$- to $C_{20}$-alkyl, $C_5$- to $C_8$-cycloalkyl, $C_6$- to $C_{20}$-aryl, $C_7$- to $C_{20}$-alkylaryl or phenyl, where any aromatic ring may also bear one or more, preferably one two, $C_1$- to $C_4$-alkyl, $C_1$- to $C_4$-alkoxy, $C_1$- to $C_4$-hydroxyalkyl or $C_1$- to $C_4$-haloalkyl radicals as substituents, where not more than one of the variables $R^5$, $R^6$ and $R^7$ is hydrogen and at least one of the variables $R^5$, $R^6$ and $R^7$ is phenyl which may also bear one or more, preferably one or two, $C_1$- to $C_4$-alkyl, $C_1$- to $C_4$-alkoxy, $C_1$- to $C_4$-hydroxyalkyl or $C_1$- to $C_4$-haloalkyl radicals as substituents.

Examples of useful protic acids include hydrochloric acid, hydrobromic acid, hydrofluoric acid, sulfuric acid, hydrocyanic acid and mixtures thereof. However, the protic acids used may also be protonated ethers.

For the present invention, very particular preference is given to further initiators selected from water, one or more protic acids, methanol, ethanol, 1-phenylethanol, 1-(p-methoxyphenyl)ethanol, n-propanol, isopropanol, 2-phenyl-2-propanol (cumene), n-butanol, isobutanol, sec-butanol, tert-butanol, 1-phenyl-1-chloroethane, 2-phenyl-2-chloropropane (cumyl chloride), tert-butyl chloride and 1,3- or 1,4-bis(1-hydroxy-1-methylethyl)benzene and mixtures thereof. Among these, preference is given in particular to further initiators selected from water, one or more protic acids, methanol, ethanol, 1-phenylethanol, 1-(p-methoxyphenyl)ethanol, n-propanol, isopropanol, 2-phenyl-2-propanol (cumene), n-butanol, isobutanol, sec-butanol, tert-butanol, 1-phenyl-1-chloroethane and 1,3- or 1,4-bis(1-hydroxy-1-methylethyl)benzene and mixtures thereof.

The molar ratio of the sum of the organic sulfonic acids of the general formula Z—$SO_3H$ used in accordance with the invention and of any further initiators to be used among those mentioned to the isobutene monomer used in the case of homopolymerization of isobutene, or to the total amount of the polymerizable monomers used in the case of copolymerization of isobutene, based on each individual functional site of the initiator (where the organic sulfonic acids should be considered as monofunctional), is generally 0.001:1 to 0.5:1, especially 0.01:1 to 0.4:1, in particular 0.1:1 to 0.3:1. When water is used as the sole further initiator or in combination with organic hydroxyl compounds and/or organic halogen compounds as further initiators, the molar ratio of water alone to the isobutene monomer used in the case of homopolymerization of isobutene, or to the total amount of the polymerizable monomers used in the case of copolymerization of isobutene is especially 0.0001:1 to 0.1:1, in particular 0.0002:1 to 0.05:1.

A proportion of the initiator molecules added as organic sulfonic acids and optionally as organic hydroxyl or halogen compounds may be incorporated into the polymer chains. The proportion ($I_{eff}$) of polymer chains which are started by such an incorporated organic initiator molecule may be up to 100%, is generally 0 to 90% and may be 5 to 90%. The remaining polymer chains arise either from water originating from traces of moisture as an initiator molecule, or from chain transfer reactions.

In a further preferred embodiment of the present invention, the polymerization is performed in the presence of 0.01 to 10 mmol, especially of 0.05 to 5.0 mmol, in particular of 0.1 to 1.0 mmol, based in each case on 1 mol of isobutene monomer used in the case of homopolymerization of isobutene, or on 1 mol of the total amount of the polymerizable monomers used in the case of copolymerization of isobutene, of a basic nitrogen compound.

Such a basic nitrogen compound used may be an aliphatic, cycloaliphatic or aromatic amine of the general formula $R^7$—$NR^8R^9$, or else ammonia, in which the variables $R^7$, $R^8$ and $R^9$ are each independently hydrogen, $C_1$- to $C_{20}$-alkyl radicals, especially $C_1$- to $C_8$-alkyl radicals, $C_5$- to $C_8$-cycloalkyl radicals, $C_6$- to $C_{20}$-aryl radicals, especially $C_6$- to $C_{12}$-aryl radicals, or $C_7$- to $C_{20}$-arylalkyl radicals, especially $C_7$- to $C_{12}$-arylalkyl radicals. When none of these variables is hydrogen, the amine is a tertiary amine. When one of these variables is hydrogen, the amine is a secondary amine. When two of these variables is hydrogen, the amine is a primary amine. When all these variables are hydrogen, the amine is ammonia.

Typical examples of such amines of the general formula $R^7$—$NR^8R^9$ are methylamine, ethylamine, n-propylamine, isopropylamine, n-butylamine, tert-butylamine, sec-butylamine, isobutylamine, tert-amylamine, n-hexylamine, n-heptylamine, n-octylamine, 2-ethylhexylamine, cyclopentylamine, cyclohexylamine, aniline, dimethylamine, diethylamine, di-n-propylamine, diisopropylamine, di-n-butylamine, di-tert-butylamine, di-sec-butylamine, diisobutylamine, di-tert-amylamine, di-n-hexylamine, di-n-heptylamine, di-n-octylamine, di-(2-ethylhexyl)amine, dicyclopentylamine, dicyclohexylamine, diphenylamine, trimethylamine, triethylamine, tri-n-propylamine, tri-isopropylamine, tri-n-butylamine, tri-tert-butylamine, tri-sec-butylamine, tri-isobutylamine, tri-tert-amylamine, tri-n-hexylamine, tri-n-heptylamine, tri-n-octylamine, tri-(2-ethylhexyl)amine, tricyclopentylamine, tricyclohexylamine, triphenylamine, dimethylethylamine, methyl-n-butylamine, N-methyl-N-phenylamine, N,N-dimethyl-N-phenylamine, N-methyl-N,N-diphenylamine or N-methyl-N-ethyl-N-n-butylamine.

In addition, such a basic nitrogen compound used may also be a compound having a plurality of, especially having two or three, nitrogen atoms and having 2 to 20 carbon atoms, where these nitrogens may each independently bear hydrogen atoms or aliphatic, cycloaliphatic or aromatic substituents. Examples of such polyamines are 1,2-ethylenediamine, 1,3-propylenediamine, 1,4-butylenediamine, diethylenetriamine, N-methyl-1,2-ethylenediamine, N,N-dimethyl-1,2-ethylenediamine, N,N'-dimethyl-1,2-ethylenediamine or N,N-dimethyl-1,3-propylenediamine.

However, a suitable basic nitrogen compound of this kind is especially a saturated, partly unsaturated or unsaturated nitrogen-containing five-membered or six-membered heterocyclic ring which comprises one, two or three ring nitrogen atoms and may have one or two further ring heteroatoms from the group of oxygen and sulfur and/or hydrocarbyl radicals, especially $C_1$- to $C_4$-alkyl radicals and/or phenyl, and/or functional groups or heteroatoms as substituents, especially fluorine, chlorine, bromine, nitro and/or cyano, for example pyrrolidine, pyrrole, imidazole, 1,2,3- or 1,2,4-triazole, oxazole, thiazole, piperidine, pyrazane, pyrazole, pyridazine, pyrimidine, pyrazine, 1,2,3-, 1,2,4- or 1,2,5-triazine, 1,2,5-oxathiazine, 2H-1,3,5-thiadiazine or morpholine.

However, a very particularly suitable basic nitrogen compound of this kind is pyridine or a derivative of pyridine (especially a mono-, di- or tri-$C_1$- to $C_4$-alkyl-substituted pyridine) such as 2-, 3-, or 4-methylpyridine (picolines), 2,3-, 2,4-, 2,5-, 2,6-, 3,4-, 3,5- or 3,6-dimethylpyridine (lutidines), 2,4,6-trimethylpyridine (collidine), 2-, 3,- or 4-tert-butylpyridine, 2-tert-butyl-6-methylpyridine, 2,4-, 2,5-, 2,6- or 3,5-di-tert-butylpyridine or else 2-, 3,- or 4-phenylpyridine.

It is possible to use a single basic nitrogen compound or mixtures of such basic nitrogen compounds.

For the use of isobutene or of an isobutene-comprising monomer mixture as the monomer to be polymerized, suitable isobutene sources in embodiment (A) and (B) are both pure isobutene and isobutenic $C_4$ hydrocarbon streams, for example $C_4$ raffinates, especially "raffinate 1", $C_4$ cuts from isobutane dehydrogenation, $C_4$ cuts from steam crackers and from FCC crackers (fluid catalyzed cracking), provided that they have been substantially freed of 1,3-butadiene present therein. A $C_4$ hydrocarbon stream from an FCC refinery unit is also known as a "b/b" stream. Further suitable isobutenic $C_4$ hydrocarbon streams are, for example, the product stream of a propylene-isobutane cooxidation or the product stream from a metathesis unit, which are generally used after customary purification and/or concentration. Suitable $C_4$ hydrocarbon streams generally comprise less than 500 ppm, preferably less than 200 ppm, of butadiene. The presence of 1-butene and of cis- and trans-2-butene is substantially uncritical. Typically, the isobutene concentration in the $C_4$ hydrocarbon streams mentioned is in the range from 30 to 60% by weight. For instance, raffinate 1 generally consists essentially of 30 to 50% by weight of isobutene, 10 to 50% by weight of 1-butene, 10 to 40% by weight of cis- and trans-2-butene, and 2 to 35% by weight of butanes; in the polymerization process according to the invention, the unbranched butenes in the raffinate 1 generally behave virtually inertly, and only the isobutene is polymerized.

In a preferred embodiment, the monomer source used for the polymerization is a technical $C_4$ hydrocarbon stream with an isobutene content of 1 to 100% by weight, especially of 1 to 99% by weight, in particular of 1 to 90% by weight, more preferably of 30 to 60% by weight, especially a raffinate 1 stream, a b/b stream from an FCC refinery unit, a product stream of a propylene-isobutane cooxidation or a product stream from a metathesis unit.

The isobutenic monomer mixture mentioned may comprise small amounts of contaminants such as water, carboxylic acids or mineral acids, without there being any critical yield or selectivity losses. It is appropriate to prevent enrichment of these impurities by removing such harmful substances from the isobutenic monomer mixture, for example by adsorption on solid adsorbents such as activated carbon, molecular sieves or ion exchangers.

It is also possible to convert monomer mixtures of isobutene or of the isobutenic hydrocarbon mixture with olefinically unsaturated monomers copolymerizable with isobutene. When monomer mixtures of isobutene are to be copolymerized with suitable comonomers, the monomer mixture preferably comprises at least 5% by weight, more preferably at least 10% by weight and especially at least 20% by weight of isobutene, and preferably at most 95% by weight, more preferably at most 90% by weight and especially at most 80% by weight of comonomers.

Useful copolymerizable monomers include: vinylaromatics such as styrene and α-methylstyrene, $C_1$- to $C_4$-alkylstyrenes such as 2-, 3- and 4-methylstyrene, and 4-tert-butylstyrene, halostyrenes such as 2-, 3- or 4-chlorostyrene, and isoolefins having 5 to 10 carbon atoms, such as 2-methylbutene-1, 2-methylpentene-1, 2-methylhexene-1, 2-ethylpentene-1, 2-ethylhexene-1 and 2-propylheptene-1. Further useful comonomers include olefins which have a silyl group, such as 1-trimethoxysilylethene, 1-(trimethoxysilyl)propene, 1-(trimethoxysilyl)-2-methylpropene-2, 1-[tri(methoxyethoxy)silyl]ethene, 1-[tri(methoxyethoxy)silyl]propene, and 1-[tri(methoxyethoxy)silyl]-2-methylpropene-2. In addition—depending on the polymerization conditions—useful comonomers also include isoprene, 1-butene and cis- and trans-2-butene.

When the process according to the invention is to be used to prepare copolymers, the process can be configured so as to preferentially form random polymers or to preferentially form block copolymers. To prepare block copolymers, for example, the different monomers can be supplied successively to the polymerization reaction, in which case the second comonomer is especially not added until the first comonomer is already at least partly polymerized. In this manner, diblock, triblock and higher block copolymers are obtainable, which, according to the sequence of monomer addition, have a block of one or the other comonomer as a terminal block. In some cases, however, block copolymers also form when all comonomers are supplied to the polymerization reaction simultaneously, but one of them polymerizes significantly more rapidly than the other(s). This is the case especially when isobutene and a vinylaromatic compound, especially styrene, are copolymerized in the process according to the invention. This preferably forms block copolymers with a terminal polystyrene block. This is attributable to the fact that the vinylaromatic compound, especially styrene, polymerizes significantly more slowly than isobutene.

The polymerization can be effected either continuously or batchwise. Continuous processes can be performed in analogy to known prior art processes for continuous polymerization of isobutene in the presence of boron trifluoride-based catalysts in the liquid phase.

The process according to the invention is suitable either for performance at low temperatures, e.g. at −90° C. to 0° C., or at higher temperatures, i.e. at least 0° C., e.g. at 0° C. to +30° C. or at 0° C. to +50° C. The polymerization in the process according to the invention is, however, preferably performed in embodiment (A) at relatively low temperatures, generally at −70° C. to −10° C., especially at −60° C. to −15° C., and in embodiment (B) at slightly higher temperatures of −30° C. to +50° C., especially at 0° C. to +30° C., for example at room temperature (+20 to +25° C.).

When the polymerization in the process according to the invention is effected at or above the boiling temperature of the monomer or monomer mixture to be polymerized, it is preferably performed in pressure vessels, for example in autoclaves or in pressure reactors.

The polymerization in the process according to the invention is preferably performed in the presence of an inert diluent. The inert diluent used should be suitable for reducing the increase in the viscosity of the reaction solution which generally occurs during the polymerization reaction to such an extent that the removal of the heat of reaction which evolves can be ensured. Suitable diluents are those solvents or solvent mixtures which are inert toward the reagents used. Suitable diluents are, for example, aliphatic hydrocarbons such as n-butane, n-pentane, n-hexane, n-heptane, n-octane and isooctane, cycloaliphatic hydrocarbons such as cyclopentane and cyclohexane, aromatic hydrocarbons such as benzene, toluene and the xylenes, and halogenated hydrocarbons, especially halogenated aliphatic hydrocarbons, such as methyl chloride, dichloromethane and trichloromethane (chloroform), 1,1-dichloroethane, 1,2-dichloroethane, trichloroethane and 1-chlorobutane and halogenated aromatic hydrocarbons and alkylaromatics halogenated in the alkyl side chains such as chlorobenzene, monofluoromethylbenzene, difluoromethylbenzene and trifluoromethylbenzene, and mixtures of the aforementioned diluents. Preferred halogenated hydrocarbons for the inert diluents mentioned above and below are chlorohydrocarbons, especially pure chlorohydrocarbons. Fluorohydrocarbons are preferably excluded from the inert diluents usable here in order to very substantially rule out residual contents of fluorine in the polymer. The diluents used, or the constituents used in the solvent mixtures mentioned, are also the inert components of isobutenic $C_4$ hydrocarbon streams.

According to embodiment (A), the inventive polymerization is preferably performed in a halogenated hydrocarbon, especially in a halogenated aliphatic hydrocarbon, or in a mixture of halogenated hydrocarbons, especially of halogenated aliphatic hydrocarbons, or in a mixture of at least one halogenated hydrocarbon, especially a halogenated aliphatic hydrocarbon, and at least one aliphatic, cycloaliphatic or aromatic hydrocarbon as an inert diluent, for example a mixture of dichloromethane and n-hexane, typically in a volume ratio of 10:90 to 90:10, especially of 50:50 to 85:15. Prior to use, the diluents are preferably freed of impurities such as water, carboxylic acids or mineral acids, for example by adsorption on solid adsorbents such as activated carbon, molecular sieves or ion exchangers.

In a further preferred variant of embodiment (A), the inventive polymerization is performed in halogen-free aliphatic or especially halogen-free aromatic hydrocarbons, especially toluene. For this embodiment, water in combination with the organic hydroxyl compounds mentioned and/or the organic halogen compounds mentioned, or especially as the sole initiator, have been found to be particularly advantageous.

According to embodiment (B), the inventive polymerization is preferably performed in an aliphatic, cycloaliphatic or aromatic hydrocarbon, in a halogenated aliphatic hydrocarbon, or in a mixture of aliphatic, cycloaliphatic and/or aromatic hydrocarbons or of halogenated aliphatic hydrocarbons, or in a mixture of at least one halogenated aliphatic hydrocarbon and at least one aliphatic, cycloaliphatic or aromatic hydrocarbon as an inert diluent.

The polymerization in the process according to the invention is preferably performed under substantially aprotic and especially under substantially anhydrous reaction conditions. Substantially aprotic and substantially anhydrous reaction conditions are understood to mean that, respectively, the content of protic impurities and the water content in the reaction mixture are less than 50 ppm and especially less than 5 ppm. In general, the feedstocks will therefore be dried before use by physical and/or chemical measures. More particularly, it has been found to be useful to admix the aliphatic or cycloaliphatic hydrocarbons used as solvents, after customary prepurification and predrying with an organometallic compound, for example an organolithium, organomagnesium or organoaluminum compound, in an amount which is sufficient to substantially remove the water traces from the solvent. The solvent thus treated is then preferably condensed directly into the reaction vessel. It is also possible to proceed in a similar manner with the monomers to be polymerized, especially with isobutene or with the isobutenic mixtures. Drying with other customary desiccants such as molecular sieves or predried oxides such as aluminum oxide, silicon dioxide, calcium oxide or barium oxide is also suitable. The halogenated solvents for which drying with metals such as sodium or potassium or with metal alkyls is not an option are freed of water or water traces with desiccants suitable for that purpose, for example with calcium chloride, phosphorus pentoxide or molecular sieves. It is also possible in an analogous manner to dry those feedstocks for which treatment with metal alkyls is likewise not an option, for example vinylaromatic compounds. Even if some or all of the initiator used is water, residual moisture should preferably be very substantially or completely removed from solvents and monomers by drying prior to reaction, in order to be able to use the water initiator in a controlled, specified amount, as a result of which greater process control and reproducibility of the results are obtained.

The polymerization of the isobutene or of the isobutenic starting material generally proceeds spontaneously when the polymerization catalyst, i.e. the iron halide-donor complex, the aluminum trihalide-donor complex or the alkylaluminum halide-donor complex, especially the iron chloride-donor complex or the aluminum trichloride-donor complex, or the at least one Lewis acid complex comprising organic sulfonic acids with or without donors, is contacted with the isobutene or the isobutenic monomer mixture at the desired reaction temperature. The procedure here may be to initially charge the monomers, optionally in the diluent, to bring it to reaction temperature and then to add the polymerization catalyst, i.e. the iron halide-donor complex, the aluminum trihalide-donor complex or the alkylaluminum halide-donor complex, especially the iron chloride-donor complex or the aluminum trichloride-donor complex, or the at least one Lewis acid complex comprising organic sulfonic acids with or without donors. The procedure may also be to initially charge the polymerization catalyst, i.e. the iron halide-donor complex, the aluminum trihalide-donor complex or the alkylaluminum halide-donor complex, especially the iron chloride-donor complex or the aluminum trichloride-donor complex, or the at least one Lewis acid complex comprising organic sulfonic acids with or without donors, optionally in the diluent, and then to add the monomers. In that case, the start of polymerization is considered to be that time at which all reactants are present in the reaction vessel.

To prepare isobutene copolymers, the procedure may be to initially charge the monomers, optionally in the diluent, and then to add the polymerization catalyst, i.e. the iron halide-donor complex, the aluminum trihalide-donor complex or the alkylaluminum halide-donor complex, especially the iron chloride-donor complex or the aluminum trichloride-donor complex, or the at least one Lewis acid complex comprising organic sulfonic acids with or without donors. The reaction temperature can be established before or after the addition of the polymerization catalyst, i.e. the iron halide-donor complex, the aluminum trihalide-donor complex or the alkylaluminum halide-donor complex, especially of the iron chloride-donor complex or the aluminum trichloride-donor complex, or of the at least one Lewis acid complex comprising organic sulfonic acids with or without donors. The procedure may also be first to initially charge only one of the monomers, optionally in the diluent, then to add the polymerization catalyst, i.e. the iron halide-donor complex, the aluminum trihalide-donor complex or the alkylaluminum halide-donor complex, especially the iron chloride-donor complex or the aluminum trichloride-donor complex, or the at least one Lewis acid complex comprising organic sulfonic acids with or without donors, and to add the further monomer(s) only after a certain time, for example when at least 60%, at least 80% or at least 90% of the monomer has been converted. Alternatively, the polymerization catalyst, i.e. the iron halide-donor complex, the aluminum trihalide-donor complex or the alkylaluminum halide-donor complex, especially the iron chloride-donor complex or the aluminum trichloride-donor complex, or the at least one Lewis acid complex comprising organic sulfonic acids with or without donors, can be initially charged, optionally in the diluent, then the monomers can be added simultaneously or successively, and then the desired reaction temperature can be established. In that case, the start of polymerization is considered to be that time at which the polymerization catalyst, i.e. the iron halide-donor complex, the aluminum trihalide-donor complex or the alkylaluminum halide-donor complex, especially the iron chloride-donor complex, the aluminum trichloride-donor complex, or the at least one Lewis acid complex comprising organic sulfonic acids with or without donors, and at least one of the monomers are present in the reaction vessel.

In addition to the batchwise procedure described here, the polymerization in the process according to the invention can also be configured as a continuous process. In this case, the feedstocks, i.e. the monomer(s) to be polymerized, optionally the diluent and optionally the polymerization catalyst, i.e. the iron halide-donor complex, the aluminum trihalide-donor complex or the alkylaluminum halide-donor complex, especially the iron chloride-donor complex or the aluminum trichloride-donor complex, or the at least one Lewis acid complex comprising organic sulfonic acids with or without donors, are supplied continuously to the polymerization reaction, and reaction product is withdrawn continuously, such that more or less steady-state polymerization conditions are established in the reactor. The monomer(s) to be polymerized can be supplied as such, diluted with a diluent or solvent, or as a monomer-containing hydrocarbon stream.

The iron halide-donor complex effective as a polymerization catalyst, the aluminum trihalide-donor complex or the alkylaluminum halide-donor complex, especially the iron chloride-donor complex or the aluminum trichloride-donor complex, or the at least one Lewis acid complex comprising organic sulfonic acids with or without donors, is generally present in dissolved, dispersed or suspended form in the polymerization medium. Supporting of the iron halide-donor complex, of the aluminum trihalide-donor complex or of the alkylaluminum halide-donor complex, especially of the iron chloride-donor complex or of the aluminum trichloride-donor complex, or of the at least one Lewis acid complex comprising organic sulfonic acids with or without donors, on customary support materials is also possible. Suitable reactor types for the polymerization process of the present invention are typically stirred tank reactors, loop reactors and tubular reactors, but also fluidized bed reactors, stirred tank reactors with or without solvent, fluid bed reactors, continuous fixed bed reactors and batchwise fixed bed reactors (batchwise mode).

In the process according to the invention, the iron halide-donor complex effective as a polymerization catalyst, the aluminum trihalide-donor complex or the alkylaluminum halide-donor complex, especially the iron chloride-donor complex or the aluminum trichloride-donor complex, or the at least one Lewis acid complex comprising organic sulfonic acids with or without donors, is generally used in such an amount that the molar ratio of element of transition groups 1 to 8 or of main groups 3 to 5 of the Periodic Table of the Elements, especially of iron and aluminum in the iron halide-donor complex, aluminum trihalide-donor complex or alkylaluminum halide-donor complex, especially in the iron halide-donor complex or aluminum trichloride-donor complex, or in the corresponding at least one organic sulfonic acid-comprising Lewis acid complex with or without donors, to isobutene in the case of homopolymerization of isobutene, or to the total amount of the polymerizable monomers used in the case of copolymerization of isobutene, is in the range from 1:10 to 1:5000, especially 1:15 to 1:1000, in particular 1:20 to 1:250.

To stop the reaction, the reaction mixture is preferably deactivated, for example by adding a protic compound, especially by adding water, alcohols such as methanol, ethanol, n-propanol and isopropanol or mixtures thereof with water, or by adding an aqueous base, for example an aqueous solution of an alkali metal or alkaline earth metal hydroxide such as sodium hydroxide, potassium hydroxide, magnesium hydroxide or calcium hydroxide, an alkali metal or alkaline earth metal carbonate such as sodium, potassium, magnesium or calcium carbonate, or an alkali metal or alkaline earth metal hydrogencarbonate such as sodium, potassium, magnesium or calcium hydrogencarbonate.

In the process according to the invention, for the derivatization by introduction of the low molecular weight polar groups A, the described high-reactivity isobutene homo- or copolymers with a content of terminal vinylidene double bonds (a-double bonds) per polyisobutene chain end of at least 50 mol %, preferably of at least 60 mol %, preferably of at least 70 mol %, preferably of at least 80 mol %, preferably of at least 85 mol %, more preferably of at least 90 mol %, even more preferably of more than 91 mol % and especially of at least 95 mol %, for example of virtually 100 mol %, are used. More particularly, high-reactivity isobutene copolymers which are formed from isobutene and at least one vinylaromatic monomer, especially styrene, and have a content of terminal vinylidene double bonds (α-double bonds) per polyisobutene chain end of at least 50 mol %, preferably of at least 60 mol %, preferably of at least 70 mol %, preferably of at least 80 mol %, preferably of at least 85 mol %, more preferably of at least 90 mol %, even more preferably of more than 91 mol % and especially of at least 95 mol %, for example of virtually 100 mol %. To prepare such copolymers of isobutene and at least one vinylaromatic monomer, especially styrene, isobutene or an isobutenic hydrocarbon cut is copolymerized with the at least one vinylaromatic monomer in a weight ratio of isobutene to vinylaromatic of 5:95 to 95:5, especially of 30:70 to 70:30.

The high-reactivity isobutene homo- or copolymers used according to the invention and specifically the isobutene homopolymers preferably have a polydispersity (PDI=$M_w$/$M_n$) of 1.05 to less than 3.5, preferably of 1.05 to less than 3.0, preferably of 1.05 to less than 2.5, preferably of 1.05 to 2.3, more preferably of 1.05 to 2.0 and especially of 1.1 to 1.85. Typical PDI values in the case of an optimal process regime are 1.2 to 1.7.

The high-reactivity isobutene homo- or copolymers used according to the invention preferably possess a number-average molecular weight $M_n$ (determined by gel permeation chromatography) of preferably 500 to 250 000, more preferably of 500 to 100 000, even more preferably of 500 to 25 000 and especially of 500 to 5000. Isobutene homopolymers even more preferably possess a number-average molecular weight $M_n$ of 500 to 10 000 and especially of 500 to 5000, for example of about 1000 or of about 2300.

More particularly, the process according to the invention is suitable for preparing isobutene homo- or copolymer derivatives of the general formula I, in which the parent hydrophobic n-functional radical of the POL has been formed by homopolymerizing isobutene or copolymerizing isobutene with up to 20% by weight of n-butene, is monofunctional and has a number-average molecular weight ($M_n$) of 500 to 5000, in particular 650 to 2500.

More particularly, the process according to the invention is additionally also suitable for preparing isobutene homo- or copolymer derivatives of the general formula I, in which the parent hydrophobic n-functional radical of the POL has been formed by homopolymerizing isobutene or copolymerizing isobutene with up to 20% by weight of n-butene, in each case with additional use of a di- or trifunctional initiator (Inifer), is di- or trifunctional and has a number-average molecular weight ($M_n$) of 500 to 10 000, in particular 1000 to 5000.

More particularly, the process according to the invention is additionally also suitable for preparing isobutene copolymer derivatives of the general formula I, in which the parent hydrophobic n-functional radical of the POL has been formed by copolymerizing isobutene with at least one vinylaromatic comonomer, optionally with additional use of a di- or trifunctional initiator (Inifer), is mono-, di- or trifunctional and has a number-average molecular weight ($M_n$) of 500 to 15 000, in particular 1000 to 10 000.

In a preferred embodiment of the process according to the invention for preparing isobutene homo- or copolymer derivatives of the general formula I, the low molecular weight polar A group is one selected from
(a) mono- or polyamino groups having up to 6 nitrogen atoms, where at least one nitrogen atom has basic properties;
(b) nitro groups, optionally in combination with hydroxyl groups;
(c) hydroxyl groups, optionally in combination with mono- or polyamino groups, where at least one nitrogen atom has basic properties;
(d) carboxyl groups or the alkali metal or alkaline earth metal salts thereof;
(e) sulfo groups or the alkali metal or alkaline earth metal salts thereof;
(f) polyoxy-$C_2$-$C_4$-alkylene moieties terminated by hydroxyl groups, mono- or polyamino groups, where at least one nitrogen atom has basic properties, or by carbamate groups;
(g) carboxylic ester groups;
(h) succinic anhydride or moieties which are derived from succinic anhydride and have hydroxyl and/or amino and/or quaternized amino and/or amido and/or imido groups, which have been prepared by thermal or halogen-catalyzed maleation of the internal double bond(s) and of the terminal vinylidene double bond(s) of the parent polyisobutene homo- or copolymers of the POL with maleic anhydride and, in the case of moieties which are derived from succinic anhydride and have hydroxyl and/or amino and/or quaternized amino and/or amido and/or imido groups, by appropriate further reactions, and any resulting carboxamide or carboximide derivative can be modified by further reaction with at least one $C_2$- to $C_{12}$-dicarboxylic anhydride, with at least one $C_2$- to $C_4$-alkylene carbonate and/or with boric acid;
(j) moieties obtained by Mannich reaction of POL-substituted phenols with aldehydes and mono- or polyamines;
(k) phenol, alkylphenol or (hydroxyalkyl) phenol moieties;
(i) hydroxymethyl groups;
(m) moieties which have been obtained by epoxidation of the terminal vinylidene double bond(s) of the parent polyisobutene homo- or copolymers of the POL and subsequent
  (i) hydrolysis to the 1,2-diol,
  (ii) reaction with a thiol or a polythiol,
  (iii) reaction with ammonia, a monoamine or a polyamine,
  (iv) reaction with a borane to give a borate ester and oxidative cleavage of the borate ester to the 1,3-diol,
  (v) conversion to an aldehyde,
  (vi) conversion to an aldehyde and conversion of the aldehyde to an oxime and reduction of the oxime to the amine,
  (vii) conversion to an aldehyde and conversion of the aldehyde to an azomethine cation and hydrolysis to the amine,
  (viii) conversion to an aldehyde and conversion of the aldehyde to an alcohol or
  (ix) conversion to an aldehyde and conversion of the aldehyde to a Schiff base or an enamine, and reduction of the Schiff base or of the enamine to the amine;
(n) moieties which have been obtained by hydroboration of the terminal vinylidene double bond(s) of the parent polyisobutene homo- or copolymers of the POL and subsequent oxidation of the primary hydroboration product; and
(o) moieties which have been obtained by hydrosilylation of the terminal vinylidene double bond(s) of the parent polyisobutene homo- or copolymers of the POL.

Examples of the above low molecular weight polar A groups include the following:

Isobutene homo- or copolymer derivatives which comprise mono- or polyamino groups (a) and are of the general formula I are based generally on high-reactivity polyisobutene having predominantly terminal vinylidene double bonds, especially on those having a number-average molecular weight $M_n$ of 300 to 5000. They may also comprise proportions of internal double bonds. Polyisobuteneamines based on high-reactivity polyisobutene which may comprise up to 20% by weight of n-butene units are obtainable, for example, according to EP-A 244 616 by hydroformylation and reductive amination with ammonia, monoamines or polyamines such as dimethylaminopropylamine, ethylenediamine, diethylenetriamine, triethylenetetramine or tetraethylenepentamine. When the preparation of the isobutene homo- or copolymer derivatives I proceeds from polyisobutene having a proportion of internal double bonds (usually in the (β- and γ position), another option is the preparation route by chlorination and subsequent amination or by oxidation of the double bond with air or ozone to give the carbonyl or carboxyl compound, and subsequent amination under reductive (hydrogenating) conditions. For the amination, it is possible here to use amines, for example ammonia, monoamines or polyamines, such as dimethylaminopropylamine, ethylenediamine, diethylenetriamine, triethylenetetramine or tetraethylenepentamine.

Further preferred isobutene homo- or copolymer derivatives I comprising monoamino groups (a) are the hydrogenation products of the reaction products formed from polyisobutenes having a mean degree of polymerization P=5 to 100 with nitrogen oxides or mixtures of nitrogen oxides and oxygen, as described especially in WO-A-97/03946.

Further preferred isobutene homo- or copolymer derivatives I comprising monoamino groups (a) are the compounds obtainable from polyisobutene epoxides by reaction with amines and subsequent dehydration and reduction of the amino alcohols, as described especially in DE-A-196 20 262.

Further preferred isobutene homo- or copolymer derivatives I comprising monoamino groups (a) are the compounds obtainable from the reaction of high-reactivity polyisobutene with one or more aromatic or heteroaromatic amines. The high-reactivity polyisobutene can be converted for this purpose with aniline, N-methylaniline, N,N-dimethylaniline, o-, m- or p-toluidine or o-, m- or p-aminopyridine to the corresponding compound polyisobutyl-substituted on the aromatic or heteroaromatic ring, for example. The aromatic amines used may also be polysubstituted, especially disubstituted, on the ring, especially by alkyl groups, for example $C_1$- to $C_4$-alkyl groups; typical substitution patterns for such substituents on the aromatic ring are the 2,3, 2,4, 2,5, 2,6, 3,4 or 3,5 arrangements. Examples of typical compounds formed here are 4-polyisobutylaniline, 4-polyisobutyl-N-methylaniline, 4-polyisobutyl-N,N-dimethylaniline, 4-polyisobutyl-3-methylaniline or 5-polyisobutyl-2-aminopyridine. Such compounds polyisobutyl-substituted on the aromatic or heteroaromatic ring are generally synthesized by the customary methods of electrophilic aromatic substitution (Friedel-Crafts alkylation) on the aromatic or heteroaromatic ring, for example using Lewis acids such as $AlCl_3$, $ZnCl_2$ or $BF_3$ as catalysts, and at elevated temperatures, especially 25 to 80° C., if required in an inert solvent.

Isobutene homo- or copolymer derivatives I comprising nitro groups (b), optionally in combination with hydroxyl groups, are preferably reaction products formed from polyisobutenes of mean degree of polymerization P=5 to 100 or 10 to 100 with nitrogen oxides or mixtures of nitrogen oxides and oxygen, as described especially in WO-A-96/03367 and WO-A-96/03479. These reaction products are generally mixtures of pure nitropolyisobutenes (e.g. α,β-dinitropolyisobutene) and mixed hydroxynitropolyisobutenes (e.g. α-nitro-β-hydroxypolyisobutene).

Isobutene homo- or copolymer derivatives I comprising hydroxyl groups in combination with mono- or polyamino groups (c) are especially reaction products of polyisobutene epoxides, obtainable from polyisobutene which preferably has predominantly terminal double bonds and has $M_n$=300 to 5000, with ammonia, mono- or polyamines, as described especially in EP-A-476 485. Isobutene homo- or copolymer derivatives I which comprise hydroxyl groups (c) and do not have any mono- or polyamino groups are, for example, reaction products of polyisobutene epoxides, obtainable from polyisobutene which preferably has predominantly terminal double bonds and has $M_n$=300 to 5000, with water (hydrolysis) or with alcohols such as methanol or ethanol, or the products of a reduction of the epoxy function, for example by means of lithium-aluminum hydride.

Isobutene homo- or copolymer derivatives I comprising carboxyl groups or the alkali metal or alkaline earth metal salts thereof (d) are generally polyisobutenes into which one or more carboxyl groups have been introduced, for example by reaction with maleic anhydride, and all or some of the carboxyl groups have then been converted to the alkali or alkaline earth metal salts and any remainder of the carboxyl groups has been reacted with alcohols or amines.

Isobutene homo- or copolymer derivatives I comprising sulfo groups or the alkali metal or alkaline earth metal salts thereof (e) are generally polyisobutenes into which one or more sulfo groups have been introduced, and all or some of the sulfo groups have then been converted to the alkali metal or alkaline earth metal salts and any remainder of the carboxyl groups has been reacted with alcohols or amines. Analogous alkali metal or alkaline earth metal salts of alkyl sulfosuccinates are described in EP-A-639 632. Such compounds serve principally to prevent valve seat wear and can be used advantageously in combination with customary fuel detergents such as poly(iso)buteneamines or polyether amines.

Isobutene homo- or copolymer derivatives I comprising polyoxy-$C_2$-$C_4$-alkylene moieties (f) are preferably polyethers or polyether amines, which are obtainable by reacting hydroxyl- or amino-containing polyisobutenes with 1 to 30 mol of ethylene oxide and/or propylene oxide and/or butylene oxide per hydroxyl group or amino group and—in the case of polyetheramines—by subsequent reductive amination with ammonia, monoamines or polyamines. Analogous reaction products of $C_2$-$C_{60}$-alkanols, $C_6$-$C_{30}$-alkanediols, mono- or di-$C_2$-$C_{30}$-alkylamines, $C_1$-$C_{30}$-alkylcyclohexanols or $C_1$-$C_{30}$-alkylphenols with 1 to 30 mol of ethyleneoxide and/or propyleneoxid and/or butyleneoxide per hydroxyl group or amino group are described in EP-A-310 875, EP-A-356 725, EP-A-700 985 and U.S. Pat. No. 4,877,416.

Isobutene homo- or copolymer derivatives I comprising carboxylic ester groups (g) are preferably esters of mono-, di- or tricarboxylic acids with hydroxyl-containing polyisobutenes. Analogous reaction products of long-chain alkanols or polyols with mono-, di- or tricarboxylic acids are described in DE-A-38 38 918. The mono-, di- or tricarboxylic acids used may be aliphatic or aromatic acids. Typical representatives of such esters are corresponding adipates, phthalates, isophthalates, terephthalates and trimellitates.

Isobutene homo- or copolymer derivatives I comprising succinic anhydride (h) are especially polyisobutenylsuccinic anhydrides, which are obtainable by reaction of high-reactivity polyisobutene with $M_n$=500 to 5000 with maleic anhydride by a thermal route or via the chlorinated polyisobutene. The polyisobutene used may be reacted with 1 equivalent ("monomaleation"), with two equivalents of maleic anhydride ("bismaleation") or with 1<n<2 equivalents of maleic anhydride, for example with 1.05 to 1.3 equivalents of maleic anhydride.

Isobutene homo- or copolymer derivatives I comprising moieties which derive from succinic anhydride and have hydroxyl and/or amino and/or quaternized amino and/or imido groups (h) are preferably corresponding derivatives of polyisobutyl- or polyisobutenyl-substituted succinic anhydride and especially the corresponding derivatives of polyisobutenylsuccinic anhydride which are obtainable by reaction of high-reactivity polyisobutene with $M_n$=300 bis 5000, which may still comprise proportions of internal double bonds, with maleic anhydride by a thermal route or via the chlorinated polyisobutene. Of particular interest in this context are derivatives with alcohols such as methanol, ethanol, n-propanol, isopropanol, n-butanol, isobutanol, sec-butanol, tert-butanol or polyethers which have been prepared by alkoxylation of the low molecular weight alcohols mentioned with $C_2$- to $C_4$-alkylene oxides. Isobutenic $C_4$ hydrocarbon streams and in particular aliphatic polyamines such as ethylenediamine, diethylenetriamine, triethylenetetramine or tetraethylenepentamine. The moieties with hydroxyl, optionally quaternized amino, amido and/or imido groups are, for example, carboxylic acid groups, acid amides of monoamines, acid amides of di- or polyamines which, as well as the amide function, also have free amine groups, succinic acid derivatives with an acid and an amide function, carboximides with monoamines, carboxyimides with di- or polyamines which, as well as the imide function, also have free amine groups, or diimides which are formed by the reaction of di- or polyamines with two succinic acid derivatives. Such compounds have been described as fuel additives in U.S. Pat. No. 4,849,572.

Isobutene homo- or copolymer derivatives I comprising moieties which derive from succinic anhydride and have quaternized amino groups are understood to mean especially quaternized nitrogen compounds which are obtainable by addition of a compound comprising at least one oxygen- or nitrogen-containing group reactive with anhydride and additionally at least one quaternizable amino group onto polyisobutenylsuccinic anhydride, and subsequent quaternization, especially with an epoxide, especially in the absence of free acid, as described in EP patent application 10 168 622.8. Suitable compounds having at least one oxygen- or nitrogen-containing group reactive with an anhydride and additionally at least one quaternizable amino group are especially polyamines having at least one primary or secondary amino group and at least one tertiary amino group. Such a quaternized nitrogen compound is, for example, the reaction product, obtained at 40° C., of polyisobutenylsuccinic anhydride in which the polyisobutenyl radical typically has an $M_n$ of 1000 with 3-(dimethylamino)-propylamine, which is a polyisobutenylsuccinic monoamide and which is subsequently quaternized with styrene oxide in the absence of free acid at 70° C.

The resulting carboxamide and carboximide derivatives in group (h) can, especially in the case of use in lubricant formulations, to improve the swelling behavior of elastomers which are incorporated, for example, in seals of engines, units or devices which come into contact with the derivatives mentioned or with lubricant formulations comprising them, also be modified with at least one $C_2$- to $C_{12}$-dicarboxylic anhydride such as maleic anhydride or phthalic anhydride, with at least one $C_2$- to $C_4$-alkylene carbonate such as ethylene carbonate or propylene carbonate, and/or with boric acid.

Isobutene homo- or copolymer derivatives I which comprise moieties (j) obtained by Mannich reaction of substituted phenols with aldehydes and mono- or polyamines are preferably reaction products of polyisobutyl-substituted phenols with aldehydes such as formaldehyde, which can also be used, for example, in oligomeric or polymeric form, for example as paraformaldehyde, and with monoamines, e.g. dimethylamine, diethylamine, propylamine, butylamine or morpholine, or with polyamines, e.g. ethylenediamine, diethylenetriamine, triethylenetetramine, tetraethylenepentamine or dimethylaminopropylamine. The polyisobutyl-substituted phenols may, in addition to the terminal vinylidene double bonds, also comprise proportions of internal double bonds. Such "polyisobutene Mannich bases" based on high-reactivity polyisobutene with $M_n$=300 to 5000 are described in EP-A-831 141.

Isobutene homo- or copolymer derivatives I comprising phenol, alkylphenol or (hydroxyalkyl)phenol moieties (k) are especially the precursors to the polyisobutene Mannich bases in group (j), which are formed by reaction of high-reactivity polyisobutene with one or more appropriate phenols, optionally with subsequent reaction with an aldehyde. For this purpose, the high-reactivity polyisobutene can be reacted, for example, with unsubstituted phenol, o-, m- or p-cresol, xylenol, hydroquinone, catechol or resorcinol. Polyisobutyl-substituted phenol thus formed can, for example, be converted further with an aldehyde, such as formaldehyde or paraformaldehyde, to a polyisobutyl-substituted hydroxyalkylphenol, especially a polyisobutyl-substituted hydroxymethylphenol, for example to 1-hydroxymethyl-4-polyisobutylphenol.

Isobutene homo- or copolymer derivatives I comprising hydroxymethyl groups (l) are especially the intermediates in the hydroformylation of high-reactivity polyisobutene according to EP-A 244 616 in the presence of carbon monoxide and hydrogen by means of a suitable hydroformylation catalyst such as a rhodium or cobalt catalyst at temperatures of 80 to 200° C. and $CO/H_2$ pressures of up to 600 bar. A hydroxymethylpolyisobutene thus obtained can be obtained as a product mixture together with a polyisobutene comprising an aldehyde group.

The moieties which are listed in group (m) under (i) to (ix) and may be present in the isobutene homo- or copolymer derivatives I, and the production thereof, are described in detail in the context of further reactions of isobutene polymer epoxides, for example in WO 2007/025700, and are reproduced below:

The epoxide can, for example, be hydrolyzed with water to give 1,2-diols or reacted with thiols or primary or secondary amines to obtain, inter alia, glycol thioethers and amines.

Reaction of an isobutene polymer which, on average, has at least 0.7, preferably at least 0.9, epoxy group per molecule with polyols or especially polythiols, such as trimethyloipropane tris(3-mercaptopropionate) or pentaerythrityl tetrakis (3-mercaptopropionate), or polyamines, such as diethylenetriamine, affords networks which are advantageous owing to their elastic and damping properties.

In a preferred further reaction, the epoxide is rearranged to the aldehyde, which can be done, for example, with catalysis by means of aluminosilicates, for example, zeolites, acidic alumina, Lewis acids such as aluminum or zinc salts, e.g. zinc bromide, or protic acids such as sulfuric acid. The aldehyde is in turn a versatile starting material for valuable products. The conversion of polyisobutenyl epoxides to aldehydes is described, for example, in WO 90/10022 and U.S. Pat. No. 6,303,703, or Organikum, 20th ed. 1999, Wiley-VCH, p. 615.

The aldehyde can be converted to an imine with ammonia or a primary amine, and the imine can be reduced, especially catalytically hydrogenated, to the amine. Suitable primary amines are, for example, diethylenetriamine, di(methylethylene)triamine, triethylenetetramine, tri(methylethylene)tetramine, tri(ethylethylene)tetramine, tetraethylenepentamine, pentaethylenehexamine, ethylenediamine, hexamethylenediamine, o-phenylenediamine, m-phenylenediamine, p-phenylenediamine, alkyl-substituted o-, m- and p-phenylenediamine, dimethylaminomethylamine, dimethylaminoethylamine, dimethylaminopropylamine, dimethylaminobutylamine, dimethylaminoheptylamine, diethylaminomethylamine, diethylaminopropylamine, diethylaminoamylamine, dipropylaminopropylamine, methylpropylaminoamylamine, propylbutylaminoethylamine, dimethylenetrianiline, methylenedianiline, polymethyleneaniline, and polyalkylmethyleneaniline. The reaction of the aldehyde with the primary amine and the hydrogenation of the resulting imine to a polyisobutenylamine is described in WO 90/10022.

The aldehyde can also be converted to an oxime, and the oxime reduced to the amine. Appropriately, hydroxylamine, which is obtained by neutralizing a hydroxylammonium salt, is used. The hydroxylamine reacts with the aldehyde to give the oxime. The oxime is then reduced by catalytic hydrogenation to the amine. The hydrogenation is effected at suitable temperature and pressure in the presence of a hydrogenation catalyst. Suitable catalysts are, for example Raney nickel, nickel on kieselguhr, copper chromite, platinum on carbon, palladium on carbon and the like. The reaction is described, for example in U.S. Pat. No. 6,303,703.

In a further preferred embodiment, the aldehyde is converted to an azomethine cation in a Leuckart reaction. To perform the Leuckart reaction, various reagents are suitable; ammonium formate is preferred. The azomethine cation can then be converted to an amine by hydrolysis. The hydrolysis can suitably be performed with dilute hydrochloric acid at moderately elevated temperature. Preference is given to using a phase transfer catalyst such as tricaprylylmethylammonium nitrate. The reaction is described, for example in U.S. Pat. No. 6,303,703.

The epoxide can additionally be converted to a 1,3-diol, for example to 2-polyisobutenyl-1,3-propanediol, by reaction with a borane and subsequent oxidative cleavage of the borate ester formed. Suitable boranes are, for example, diborane ($B_2H_6$) and alkyl- and arylboranes. It is familiar to the person skilled in the art that such boranes can also be prepared in situ from a borohydride and an acid, usually $BF_3$ etherate. The reaction with the borane is effected suitably in a borane-coordinating solvent. Examples thereof are open-chain ethers such as dialkyl ethers, diaryl ethers or alkyl aryl ethers, and cyclic ethers, such as tetrahydrofuran or 1,4-dioxane, but solvents such as toluene, cyclohexane, and methylene chloride are also suitable. The oxidative cleavage to give the 1,3-diol can be effected, for example, by means of hydrogen peroxide in the presence of a base with heating to, for example, from 50 to 75° C. Suitable solvents for this purpose are ethers or mixtures of ethers and hydrocarbons.

Moieties (n) which result from hydroboration reactions and may be present in the isobutene homo- or copolymer derivatives I, and the production thereof, are described in detail, for example, in WO 2004/067583. General fundamentals of hydroboration are described in J. March, Advanced Organic Chemistry, 4th edition, Verlag J. Wiley & Sons, p. 783-789.

The suitable borane sources include in particular borane ($BH_3$) itself, which typically occurs in the form of the dimer thereof ($B_2H_6$). Appropriately, the borane is obtained in situ by reaction of suitable precursors, especially of alkali metal or alkaline earth metal salts of the $BH_4$ anion with boron trihalides. Typically, sodium borohydride and boron trifluoride etherate are used here.

A preferred hydroboration agent for the terminal vinylidene double bonds of the polyisobutene is the reaction product of a borane source, for example borane obtained in situ from alkali metal or alkaline earth metal salts of the $BH_4$ anion with boron trihalides, with 0.5 to 1.8 equivalents per mole of borane of an alkene of molecular weight less than 250, for example 2-methyl-2-butene or 1-methylcyclohexene.

The subsequent oxidation of the primary hydroboration product is effected typically with alkaline hydrogen peroxide to obtain an alcohol, which preferably corresponds in formal terms to the anti-Markovnikov hydration product of the unsaturated isobutene polymer. Alternatively, the polyisobutylboranes obtained as the primary hydroboration product can also be subjected to an oxidative reaction with bromine in the presence of hydroxide ions to obtain the bromide.

Moieties (o) which result from hydrosilylation reactions and may be present in the isobutene homo- or copolymer derivatives I, and the production thereof, are described in detail, for example, in WO 2003/074577. For this purpose, a high-reactivity polyisobutene can be subjected to a reaction with a silane in the presence of a silylation catalyst to obtain a polyisobutene at least partly functionalized with silyl groups. Silylated isobutene polymers are again valuable starting materials for further conversions to novel products, for example for moisture-curing sealing compounds and for formulations in which glass adhesion is important.

Suitable hydrosilylation catalysts are especially transition metal catalysts where the transition metal is selected from Pt, Pd, Rh, Ru and Ir, for example finely divided platinum, platinum chloride, hexachloroplatinic acid, tetramethyldivinyldisiloxane-platinum complexes, $RhCl[P(C_6H_5)_3]_3$, $RhCl_3$, $RuCl_3$ or $IrCl_3$. Suitable hydrosilylation catalysts are additionally Lewis acids such as aluminum trichloride or titanium tetrachloride, and peroxides.

Suitable silanes are, for example, halogenated silanes such as trichlorosilane, methyldichlorosilane, dimethylchlorosilane and trimethylsiloxydichlorosilane, alkoxysilanes such as trimethoxysilane, triethoxysilane, methyldimethoxysilane, phenyldimethoxysilane, 1,3,3,5,5,7,7-heptamethyl-1,1-dimethoxytetrasiloxane and acyloxysilanes.

The reaction temperature in the hydrosilylation is preferably in the range from 0 to 140° C., especially 40 to 120° C. The reaction is typically performed at standard pressure, but can also be effected at elevated pressures, for example at 1.5 to 20 bar, or reduced pressure, for example at 200 to 600 mbar. The reaction can be effected without solvent or in the presence of a suitable inert solvent such as toluene, tetrahydrofuran or chloroform.

In a preferred embodiment, the process according to the invention for preparing isobutene homo- or copolymer derivatives of the general formula I in which A is a low molecular weight polar group which comprises an amino function is performed by polymerizing isobutene or an isobutene-comprising monomer mixture in the presence (A) of an iron halide-donor complex effective as a polymerization catalyst, of an aluminum trihalide-donor complex or of an alkylaluminum halide-donor complex which comprises, as the donor, an organic compound with at least one ether function or a carboxylic ester function, in particular with additional use of an initiator, or (B) of at least one Lewis acid suitable as a polymerization catalyst or of a complex which is effective as a polymerization catalyst and is formed from at least one Lewis acid and at least one donor, and in the presence of at least one initiator, using as the at least one initiator an organic sulfonic acid of the general formula $Z—SO_3H$ in which the variable Z denotes a $C_1$- to $C_{20}$-alkyl radical, $C_1$- to $C_{20}$-haloalkyl radical, $C_5$- to $C_8$-cycloalkyl radical, $C_6$- to $C_{20}$-aryl radical or a $C_7$- to $C_{20}$-arylalkyl radical, hydroformylating the resulting high-reactivity isobutene homo- or copolymer with a suitable catalyst in the presence of carbon monoxide and hydrogen, and then reductively aminating in the presence of at least n equivalents of ammonia or of a mono- or polyamine.

The hydroformylation and the reductive amination of high-reactivity polyisobutenes are described, for example, in EP-A 244 616. In this case, the hydroformylation is performed in the presence of carbon monoxide and hydrogen, typically by means of a suitable hydroformylation catalyst such as a rhodium or cobalt catalyst, at temperatures of 80 to 200° C. and $CO/H_2$ pressures of up to 600 bar. The subsequent reductive amination of the oxo product obtained (hydroxymethylpolyisobutene or product mixture of hydroxymethylpolyisobutene and polyisobutenealdehyde of the same carbon number) is effected generally at temperatures of 80 to 200° C. and hydrogen pressures of up to 600 bar, especially 80 to 300 bar.

In a further preferred embodiment, the process according to the invention for preparing isobutene homo- or copolymer derivatives of the general formula I in which A is a low molecular weight polar group which comprises an amino function is performed by polymerizing isobutene or an isobutene-comprising monomer mixture in the presence (A) of an iron halide-donor complex effective as a polymerization catalyst, of an aluminum trihalide-donor complex or of an alkylaluminum halide-donor complex which comprises, as the donor, an organic compound with at least one ether function or a carboxylic ester function, in particular with additional use of an initiator, or (B) of at least one Lewis acid suitable as a polymerization catalyst or of a complex which is effective as a polymerization catalyst and is formed from at least one Lewis acid and at least one donor, and in the presence of at least one initiator, using as the at least one initiator an organic sulfonic acid of the general formula $Z—SO_3H$ in which the variable Z denotes a $C_1$- to $C_{20}$-alkyl radical, $C_1$- to $C_{20}$-haloalkyl radical, $C_5$- to $C_8$-cycloalkyl radical, $C_6$- to $C_{20}$-aryl radical or a $C_7$- to $C_{20}$-arylalkyl radical, treating the resulting high-reactivity isobutene homo- or copolymer with a suitable activating agent, especially with chlorine, and then reacting with n equivalents of ammonia or of a mono- or polyamine.

In a further preferred embodiment, the process according to the invention for preparing isobutene homo- or copolymer derivatives of the general formula I in which A is a low molecular weight polar group which comprises a carboxylic acid derivative function, especially a carboximide function, is performed by polymerizing isobutene or an isobutene-comprising monomer mixture in the presence (A) of an iron halide-donor complex effective as a polymerization catalyst, of an aluminum trihalide-donor complex or of an alkylaluminum halide-donor complex which comprises, as the donor, an organic compound with at least one ether function or a carboxylic ester function, in particular with additional use of an initiator, or (B) of at least one Lewis acid suitable as a polymerization catalyst or of a complex which is effective as a polymerization catalyst and is formed from at least one Lewis acid and at least one donor, and in the presence of at least one initiator, using as the at least one initiator an organic sulfonic acid of the general formula $Z—SO_3H$ in which the variable Z denotes a $C_1$- to $C_{20}$-alkyl radical, $C_1$- to $C_{20}$-haloalkyl radical, $C_5$- to $C_8$-cycloalkyl radical, $C_6$- to $C_{20}$-aryl radical or a $C_7$- to $C_{20}$-arylalkyl radical, reacting the resulting high-reactivity isobutene homo- or copolymer with an ethylenically unsaturated $C_4$- to $C_{12}$-dicarboxylic acid or a reactive derivative thereof, especially with maleic anhydride, thermally or with halogen catalysis, and optionally subsequently converting the product with a mono- or polyamine to the corresponding carboxamide or carboximide derivative, and the resulting carboxamide or carboximide derivative can be modified by further reaction with at least one $C_2$- to $C_{12}$-dicarboxylic anhydride, with at least one $C_2$- to $C_4$-alkylene carbonate and/or with boric acid.

In a further preferred embodiment, the process according to the invention for preparing isobutene homo- or copolymer derivatives of the general formula I in which A is a low molecular weight polar group which comprises an amino function is performed by polymerizing isobutene or an isobutene-comprising monomer mixture in the presence (A) of an iron halide-donor complex effective as a polymerization catalyst, of an aluminum trihalide-donor complex or of an alkylaluminum halide-donor complex which comprises, as the donor, an organic compound with at least one ether function or a carboxylic ester function, in particular with additional use of an initiator, or (B) of at least one Lewis acid suitable as a polymerization catalyst or of a complex which is effective as a polymerization catalyst and is formed from at least one Lewis acid and at least one donor, and in the presence of at least one initiator, using as the at least one initiator an organic sulfonic acid of the general formula $Z—SO_3H$ in which the variable Z denotes a $C_1$- to $C_{20}$-alkyl radical, $C_1$- to $C_{20}$-haloalkyl radical, $C_5$- to $C_8$-cycloalkyl radical, $C_6$- to $C_{20}$-aryl radical or a $C_7$- to $C_{20}$-arylalkyl radical, converting the resulting high-reactivity isobutene homo- or copolymer with a phenol to the corresponding alkylphenol, and then converting the latter by reaction with an aldehyde and a primary or secondary amine to the corresponding Mannich adduct.

The present invention also provides novel isobutene homopolymer derivatives of the general formula II

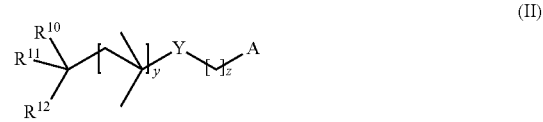

(II)

in which
$R^{10}$, $R^{11}$ and $R^{12}$ each independently denote hydrogen, $C_1$- to $C_{20}$-alkyl, $C_5$- to $C_8$-cycloalkyl, $C_6$- to $C_{20}$-aryl, $C_7$- to $C_{20}$-alkylaryl or phenyl, where any aromatic ring may also bear one or more $C_1$- to $C_4$-alkyl or $C_1$- to $C_4$-alkoxy radicals or moieties of the general formula III

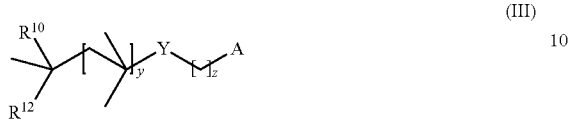

(III)

as substituents, where not more than one of the variables $R^{10}$, $R^{11}$ and $R^{12}$ is hydrogen and at least one of the variables $R^{10}$, $R^{11}$ and $R^{12}$ is phenyl which may also bear one or more $C_1$- to $C_4$-alkyl or $C_1$- to $C_4$-alkoxy radicals or one or two moieties of the general formula III as substituents, Y is an isobutylene or an isobutenylene bridge unit, A is a low molecular weight polar group which comprises one or more amino functions and/or nitro groups and/or hydroxyl groups and/or carboxylic acid or carboxylic acid derivative functions, especially succinic anhydride or succinic acid derivative functions, and/or sulfonic acid or sulfonic acid derivative functions and/or aldehyde functions and/or silyl groups, y is from 1 to 350, especially from 9 to 100, in particular from 12 to 50, where the two or three variables y in the molecule in the case of telechelic isobutene homopolymer derivatives II may be the same or different, and z is 0 or preferably 1.

The isobutene homo- and copolymer derivatives prepared in accordance with the invention are suitable, for example, as fuel and lubricant additives.

The isobutene homo- or copolymer derivatives prepared in accordance with the invention are prepared from isobutene polymers having a high content of terminal vinylidene double bonds, which is usually much higher than 90 mol %, and can thus be obtained in high yields. In addition, appearance and consistency of these derivatives, for example the color thereof, are improved. In addition, the physical properties of these derivatives, especially the viscosity behavior at low temperatures, and the solubilities, especially in polar media, the thermal stability and the storage stability of the derivatives are also improved. The catalyst system used to obtain isobutene polymers in the precursor is sufficiently active, long-lived, unproblematic to handle and not susceptible to faults, and more particularly is free of fluorine; thus, unwanted corrosion caused by the residual fluorine content on metallic materials and steel types is avoided.

The invention claimed is:

1. A process for preparing isobutene homo- or copolymer derivatives of the formula (I):

POL(-A)$_n$  (I), wherein:
POL represents an n-functional radical of a hydrophobic polyisobutene homo- or copolymer which has a number-average molecular weight ($M_n$) of from 110 to 250,000;
A independently represents a low molecular weight polar group consisting of at least one mono- or polyamino group having up to 6 nitrogen atoms, wherein at least one nitrogen atom has basic properties, and wherein A is the same or different when n=2 and n=3; and n is 1, 2 or 3; the process comprising:
polymerizing isobutene or a monomer mixture comprising isobutene in the presence of an aluminum trihalide-donor complex, or an alkylaluminum halide-donor complex, as a polymerization catalyst, comprising, as the donor, an organic compound comprising at least one ether function or a carboxylic ester function, and at least one initiator selected from the group consisting of an organic halogen compound, a protic acid, and an alcohol having the formula: $R^5$—OH,
wherein $R^5$ is a $C_1$- to $C_{20}$-alkyl radical or a $C_5$- to $C_8$-cycloalkyl radical,
to obtain a resulting high-reactivity isobutene homo- or copolymer having a content of terminal vinylidene double bonds of at least 50 mol % per polyisobutene chain end; and
reacting the resulting high-reactivity isobutene homo- or copolymer with a compound which introduces the low molecular weight polar A group to obtain (i) an isobutene homo- or copolymer comprising the low molecular weight polar A group, or a compound which introduces a precursor of the low molecular weight polar A group to obtain (ii) an isobutene homo- or copolymer comprising the precursor of the low molecular weight polar A group; and
optionally reacting the isobutene homo- or copolymer (ii) comprising the precursor of the low molecular weight polar A group to obtain the isobutene homo- or copolymer (i) comprising the low molecular weight polar A group,
wherein the low molecular weight polar A group does not comprise moieties which are derived from succinic anhydride and have amino groups, amido groups, or combinations thereof.

2. The process according to claim 1, comprising polymerizing the isobutene or the monomer mixture comprising isobutene in the presence of the aluminum trichloride-donor complex.

3. The process according to claim 1, comprising polymerizing in the presence of the aluminum trihalide-donor complex or the alkylaluminum halide-donor complex, comprising, as the donor, a dihydrocarbyl ether of the formula $R^1$—O—$R^2$, wherein $R^1$ and $R^2$ are each independently a $C_1$- to $C_{20}$-alkyl radical, a $C_5$- to $C_8$-cycloalkyl radical, a $C_6$- to $C_{20}$-aryl radical, or a $C_7$- to $C_{20}$-arylalkyl radical.

4. The process according to claim 1, comprising polymerizing in the presence of the aluminum trihalide-donor complex or the alkylaluminum halide-donor complex, comprising, as the donor, a hydrocarbyl carboxylate of the formula $R^3$—COOR$^4$, wherein $R^3$ and $R^4$ are each independently a $C_1$- to $C_{20}$-alkyl radical, a $C_5$- to $C_8$-cycloalkyl radical, a $C_6$- to $C_{20}$-aryl radical or a $C_7$- to $C_{20}$-arylalkyl radical.

5. The process according to claim 1, comprising polymerizing in the presence of the aluminum trihalide-donor complex or the alkylaluminum halide-donor complex, comprising, as the donor, an organic compound having a total carbon number of from 3 to 16.

6. The process according to claim 1, wherein the initiator is selected from the group consisting of a protic acid, methanol, ethanol, n-propanol, isopropanol, n-butanol, isobutanol, sec-butanol, tert-butanol, 1-phenyl-1-chloroethane, 2-phenyl-2-chloropropane, tert-butyl chloride and a mixture thereof.

7. The process according to claim 1, comprising polymerizing in the presence of from 0.01 to 10 mmol, based on 1 mol of isobutene in the case of homopolymerization, or based on 1 mol of a total amount of polymerizable monomers in the case of copolymerization, of a basic nitrogen compound.

8. The process according to claim 7, wherein the basic nitrogen compound is pyridine or a derivative of pyridine.

9. The process according to claim 1, comprising polymerizing in the presence of a halogenated aliphatic hydrocarbon or in a mixture of halogenated aliphatic hydrocarbons or in a mixture of at least one halogenated aliphatic hydrocarbon and at least one aliphatic, cycloaliphatic or aromatic hydrocarbon or in a halogen-free aliphatic or halogen-free aromatic hydrocarbon as an inert diluent.

10. The process according to claim 1, wherein the isobutene or the monomer mixture is a technical $C_4$ hydrocarbon stream having an isobutene content of from 1 to 100% by weight, a b/b stream from an FCC refinery unit, a product stream from a propylene-isobutane cooxidation or a product stream from a metathesis unit.

11. The process according to claim 1, wherein, in the formula (I), the n-functional radical of the POL:
- is formed by homopolymerizing isobutene or copolymerizing isobutene with up to 20% by weight of n-butene;
- is monofunctional; and
- has a number-average molecular weight ($M_n$) of from 500 to 5000.

12. The process according to claim 1, wherein, in the formula (I), the n-functional radical of the POL:
- is formed by homopolymerizing isobutene or copolymerizing isobutene with up to 20% by weight of n-butene, in the presence of a di- or trifunctional initiator;
- is di- or trifunctional; and
- has a number-average molecular weight ($M_n$) of from 500 to 10,000.

13. The process according to claim 1, wherein, in the formula (I), the n-functional radical of the POL:
- is formed by copolymerizing isobutene with at least one vinylaromatic comonomer, optionally in the presence of a di- or trifunctional initiator;
- is mono-, di- or trifunctional; and
- has a number-average molecular weight ($M_n$) of from 500 to 15,000.

14. The process according to claim 1, further comprising:
hydroformylating the resulting high-reactivity isobutene homo- or copolymer with a catalyst in the presence of carbon monoxide and hydrogen, to obtain a precursor of the low molecular weight polar A group; and then
reductively aminating the precursor of the low molecular weight polar A group in the presence of ammonia or of a mono- or polyamine to obtain the isobutene homo- or copolymer comprising the low molecular weight polar A group.

15. The process according to claim 1, further comprising:
treating the resulting high-reactivity isobutene homo- or copolymer with an activating agent, to obtain the precursor of the low molecular weight polar A group; and then
reacting the precursor of the low molecular weight polar A group with ammonia or a mono- or polyamine to obtain the isobutene homo- or copolymer comprising the low molecular weight polar A group.

16. The process according to claim 1, wherein iron (III) chloride is not used in the polymerizing.

* * * * *

UNITED STATES PATENT AND TRADEMARK OFFICE
CERTIFICATE OF CORRECTION

PATENT NO.        : 10,745,496 B2                                    Page 1 of 1
APPLICATION NO.   : 15/046987
DATED             : August 18, 2020
INVENTOR(S)       : Hannah Maria Koenig et al.

It is certified that error appears in the above-identified patent and that said Letters Patent is hereby corrected as shown below:

Column 3, Line 26, "initiators," should read -- initiators. --.

Column 9, Line 27, "$C_{11}$-" should read -- $C_1$- --.

Column 12, Line 61, "to $C_8$" should read -- $C_1$- to $C_8$ --.

Column 13, Line 24, "$C_4$ -aralkyl) aluminum" should read -- $C_4$ -alkyl)aluminum --;
    Line 37, "$YCI_3$," should read -- $VCI_3$, --;
    Line 38, "$CrO_3$," should read -- $CrCl_3$, --; and
    Line 59, "$MnBr2$," should read -- $MnBr_2$, --.

Column 28, Line 48, "propyleneoxid" should read -- propylene oxide --.

Column 30, Lines 56-57, "trimethyloipropane" should read -- trimethylolpropane --.

Column 32, Line 41, "hexachioroplatinic" should read -- hexachloroplatinic --.

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*